United States Patent
Na et al.

(10) Patent No.: US 10,782,842 B2
(45) Date of Patent: *Sep. 22, 2020

(54) TOUCH PANEL AND DISPLAY APPARATUS INCLUDING THE SAME

(71) Applicant: Samsung Display Co., Ltd., Yongin (KR)

(72) Inventors: Hyunjae Na, Seoul (KR); Sanghyun Jun, Suwon-si (KR); Gwang-bum Ko, Seongnam-si (KR); Joohyung Lee, Gwacheon-si (KR); Jigong Lee, Cheonan-si (KR); Hyoungwook Jang, Anyang-si (KR); Soonsung Ahn, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/352,961

(22) Filed: Mar. 14, 2019

(65) Prior Publication Data

US 2019/0212847 A1    Jul. 11, 2019

Related U.S. Application Data

(63) Continuation of application No. 15/905,638, filed on Feb. 26, 2018, now Pat. No. 10,254,908, which is a
(Continued)

(30) Foreign Application Priority Data

Aug. 13, 2014 (KR) .................. 10-2014-0105280
Aug. 28, 2014 (KR) .................. 10-2014-0113367
Feb. 12, 2015 (KR) .................. 10-2015-0021837

(51) Int. Cl.
G06F 3/047 (2006.01)
G06F 3/044 (2006.01)
G09G 5/00 (2006.01)

(52) U.S. Cl.
CPC .............. *G06F 3/047* (2013.01); *G06F 3/044* (2013.01); *G09G 5/003* (2013.01);
(Continued)

(58) Field of Classification Search
CPC . G06F 2203/04107; G06F 2203/04111; G06F 2203/04112; G06F 2203/04113;
(Continued)

(56) References Cited

U.S. PATENT DOCUMENTS 7,663,607 B2 *  2/2010  Hotelling .............. G06F 3/0416
                                                          345/173
8,199,127 B2    6/2012  Mamba et al.
(Continued)

FOREIGN PATENT DOCUMENTS

CN      101655758       2/2010
CN      103294311       9/2013
(Continued)

OTHER PUBLICATIONS

European Search Report dated Dec. 21, 2015 in Application No. 15180417.6-1972.
(Continued)

*Primary Examiner* — Grant Sitta
(74) *Attorney, Agent, or Firm* — H.C. Park & Associates, PLC

(57) ABSTRACT

A touch panel including a substrate, first touch electrodes, each of the first touch electrodes including first mesh patterns disposed on the substrate, an insulation layer disposed on the first touch electrodes, second touch electrodes, each of the second touch electrodes including second mesh pat-
(Continued)

terns disposed on the insulation layer, first auxiliary mesh electrodes disposed on the substrate, the first auxiliary mesh electrodes being electrically connected to at least a portion of the corresponding second mesh patterns, and second auxiliary mesh electrodes disposed on the insulation layer, the second auxiliary mesh electrodes being electrically connected to at least a portion of the corresponding first mesh patterns.

13 Claims, 30 Drawing Sheets

Related U.S. Application Data continuation of application No. 14/818,850, filed on Aug. 5, 2015, now Pat. No. 9,927,939.

(52) U.S. Cl.
CPC ........... *G06F 2203/04111* (2013.01); *G06F 2203/04112* (2013.01); *G09G 2300/0426* (2013.01)

(58) Field of Classification Search
CPC ....... G06F 3/044; G06F 3/045; H05K 1/0287; H05K 1/0289; H05K 1/0296; H05K 1/092; H05K 9/0047
USPC .................................................. 345/173–175
See application file for complete search history.

(56) References Cited

U.S. PATENT DOCUMENTS

| | | | |
|---|---|---|---|
| 8,508,680 B2 | 8/2013 | Geaghan et al. | |
| 8,570,287 B2* | 10/2013 | Wang | G06F 3/044 178/18.01 |
| 8,717,333 B2 | 5/2014 | Ozeki et al. | |
| 8,928,601 B2 | 1/2015 | Lee et al. | |
| 8,946,690 B2 | 2/2015 | Lee et al. | |
| 8,947,366 B2* | 2/2015 | Chien | G06F 3/044 178/18.01 |
| 9,298,331 B2 | 3/2016 | Nakamura | |
| 9,370,095 B2* | 6/2016 | Kuriki | G06F 3/041 |
| 9,489,094 B2* | 11/2016 | Kim | G06F 3/047 |
| 9,542,025 B2 | 1/2017 | Wang et al. | |
| 9,634,660 B2 | 4/2017 | Trend et al. | |
| 9,740,344 B2 | 8/2017 | Huang et al. | |
| 10,254,908 B2* | 4/2019 | Na | G06F 3/044 |
| 2005/0030048 A1 | 2/2005 | Bolender et al. | |
| 2006/0066581 A1 | 3/2006 | Lyon et al. | |
| 2007/0242054 A1* | 10/2007 | Chang | G06F 3/044 345/173 |
| 2008/0309633 A1 | 12/2008 | Hotelling et al. | |
| 2009/0085885 A1 | 4/2009 | Wu et al. | |
| 2010/0045614 A1 | 2/2010 | Gray et al. | |
| 2010/0045625 A1* | 2/2010 | Yang | G06F 3/044 345/173 |
| 2011/0032193 A1 | 2/2011 | Szalkowski | |
| 2011/0057900 A1* | 3/2011 | Huang | G06F 3/044 345/174 |
| 2011/0261003 A1 | 10/2011 | Lee et al. | |
| 2012/0312677 A1 | 12/2012 | Kuriki | |
| 2013/0106752 A1* | 5/2013 | Lin | G06F 3/044 345/173 |
| 2013/0241845 A1 | 9/2013 | Hsu et al. | |
| 2013/0278513 A1 | 10/2013 | Jang | |
| 2013/0327560 A1 | 12/2013 | Ichiki | |
| 2013/0341651 A1 | 12/2013 | Kim et al. | |
| 2014/0035602 A1 | 2/2014 | Nagarajan et al. | |
| 2014/0111709 A1 | 4/2014 | Kim et al. | |
| 2014/0118641 A1 | 5/2014 | Ryu et al. | |
| 2014/0152579 A1 | 6/2014 | Frey | |
| 2014/0168109 A1 | 6/2014 | Kang et al. | |
| 2014/0184939 A1 | 7/2014 | Lai et al. | |
| 2014/0218631 A1 | 8/2014 | Kang et al. | |
| 2014/0232959 A1 | 8/2014 | Kuriki | |
| 2014/0253499 A1 | 9/2014 | Lee et al. | |
| 2014/0299357 A1 | 10/2014 | Nakamura | |
| 2014/0299361 A1 | 10/2014 | Nakamura et al. | |
| 2015/0041647 A1* | 2/2015 | Tiemeijer | H01J 37/261 250/307 |
| 2015/0054803 A1 | 2/2015 | Yashiro et al. | |
| 2015/0060125 A1 | 3/2015 | Stevenson et al. | |
| 2015/0220181 A1 | 8/2015 | Jung | |
| 2016/0041643 A1* | 2/2016 | Gu | G06F 3/044 345/174 |
| 2018/0157292 A1 | 6/2018 | Lee | |

FOREIGN PATENT DOCUMENTS

| | | |
|---|---|---|
| CN | 103472951 | 12/2013 |
| CN | 103777814 | 5/2014 |
| JP | 2008134975 | 6/2008 |
| JP | 2009205321 | 9/2009 |
| JP | 2010-044453 | 2/2010 |
| JP | 2011-070536 | 4/2011 |
| JP | 2013-149236 | 8/2013 |
| JP | 2013-191235 | 9/2013 |
| JP | 2014-021522 | 2/2014 |
| JP | 2014071734 | 4/2014 |
| JP | 2014096030 | 5/2014 |
| JP | 2014102699 | 6/2014 |
| JP | 2014130383 | 7/2014 |
| KR | 10-2010-0138964 | 12/2010 |
| KR | 10-2011-0020049 | 3/2011 |
| KR | 10-2011-0044670 | 4/2011 |
| KR | 10-2011-0106678 | 9/2011 |
| KR | 10-2011-0127236 | 11/2011 |
| KR | 10-2013-0044058 | 5/2013 |
| KR | 10-2013-0118072 | 10/2013 |
| KR | 10-2014-0051649 | 5/2014 |
| TW | 200739401 | 10/2007 |
| TW | M470315 | 1/2014 |
| WO | 2013157532 | 10/2013 |

OTHER PUBLICATIONS

European Search Report dated Apr. 19, 2016, issued in European Patent Application 15180417.6.
Non Final Office Action dated Jan. 26, 2017, in U.S. Appl. No. 14/818,850.
Final Office Action dated Aug. 2, 2017, in U.S. Appl. No. 14/818,850.
Notice of Allowance dated Nov. 15, 2017, in U.S. Appl. No. 14/818,850.
Non Final Office Action dated May 2, 2018, in U.S. Appl. No. 15/905,638.
Final Office Action dated Sep. 11, 2018, in U.S. Appl. No. 15/905,638.
Notice of Allowance dated Nov. 30, 2018, in U.S. Appl. No. 15/905,638.
Notice of Allowance dated Feb. 15, 2018, in U.S. Appl. No. 14/818,850.
Chinese Office Action dated Jun. 28, 2019, issued in Chinese Patent Application No. 201510486936.4.
Examination Report dated Jul. 2, 2019, issued on Japanese Patent Application No. 2015-159505.

* cited by examiner

TOUCH PANEL AND DISPLAY APPARATUS INCLUDING THE SAME

CROSS-REFERENCE TO RELATED APPLICATIONS

This application is a Continuation of U.S. patent application Ser. No. 15/905,638, filed Feb. 26, 2018, which is a Continuation of U.S. patent application Ser. No. 14/818,850, filed on Aug. 5, 2015, and claims priority from and the benefit of Korean Patent Application No. 10-2014-0105280, filed on Aug. 13, 2014, Korean Patent Application No. 10-2014-0113367, filed on Aug. 28, 2014, and Korean Patent Application No. 10-2015-0021837, filed on Feb. 12, 2015, which are hereby incorporated by reference for all purposes as if fully set forth herein.

BACKGROUND

Field

Exemplary embodiments relate to a touch panel and a display apparatus including the same.

Discussion of the Background

Touch panels are input devices for inputting a predetermined command when touched by a user's own hand or an object.

Because touch panels can substitute for separate input devices such as a keyboard, a mouse, and the like, they are being used more often in mobile devices.

A touch panel may include many types, such as a resistive overlay touch panel, a photosensitive touch panel, and a capacitive touch panel. Among these touch panel types, the capacitive touch panel is widely used and includes a plurality of touch electrodes. The capacitive touch panel detects an input at a particular point where the capacitance changes due to a person's finger or other conducting object contacting that particular point. The capacitive touch panel may be coupled to a display panel.

However, a display panel with a capacitive touch panel may malfunction because the capacitive touch panel has a considerable RC delay due to parasitic capacitance existing between a touch electrode and another component (e.g., a cathode electrode).

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch panel in which an auxiliary mesh electrode is provided to reduce resistance of a touch electrode and thus improve RC delay and a display apparatus including the same.

Exemplary embodiments also provide a touch panel that is capable of securing uniform visibility over an entire region and a display apparatus including the same.

An exemplary embodiment discloses a touch panel including a substrate, first touch electrodes, each of the first touch electrodes including first mesh patterns disposed on the substrate, an insulation layer disposed on the first touch electrodes, second touch electrodes, each of the second touch electrodes including second mesh patterns disposed on the insulation layer, first auxiliary mesh electrodes disposed on the substrate, the first auxiliary mesh electrodes being electrically connected to at least a portion of the corresponding second mesh patterns, and second auxiliary mesh electrodes disposed on the insulation layer, the second auxiliary mesh electrodes being electrically connected to at least a portion of the corresponding first mesh patterns.

An exemplary embodiment also discloses a touch panel including a substrate, first touch electrodes disposed on the substrate and each of the first touch electrodes includes mesh patterns, the first touch electrodes extending in a first direction, an insulation layer disposed on the first touch electrodes, second touch electrodes disposed on the insulation layer, the second touch electrodes extending in a second direction crossing the first direction, first auxiliary electrodes disposed on the same layer as the first touch electrodes and each of which has a mesh shape, the first auxiliary electrodes being electrically connected to at least a portion of the second touch electrodes, and second auxiliary electrodes disposed on the same layer as the second touch electrodes, the second auxiliary electrodes being electrically connected to at least a portion of the first touch electrodes. Each of the second touch electrodes includes first portions disposed on first regions and second portions disposed on second regions different from the first regions and second portions having a pattern shape different from the first portions.

An exemplary embodiment also discloses a display apparatus including a display panel for displaying an image and a touch panel coupled to the display panel. The touch panel includes a substrate, first touch electrodes disposed on the substrate and extending in a first direction, each of the first touch electrodes including mesh patterns, an insulation layer disposed on the first touch electrodes, second touch electrodes disposed on the insulation layer to extend in a second direction crossing the first direction, first auxiliary electrodes disposed on the same layer as the first touch electrodes and each of which has a mesh shape, the auxiliary electrodes being electrically connected to at least a portion of the second touch electrodes, and second auxiliary electrodes disposed on the same layer as the second touch electrodes, the second auxiliary electrodes being electrically connected to at least a portion of the first touch electrodes. The second touch electrodes includes first portions disposed on first regions and second portions disposed on second regions different from the first regions and each of which has a pattern shape different from that of each of the first portions.

Additional aspects will be set forth in the detailed description which follows, and, in part, will be apparent from the disclosure, or may be learned by practice of the inventive concept.

The foregoing general description and the following detailed description are exemplary and explanatory and are intended to provide further explanation of the claimed subject matter.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept.

DETAILED DESCRIPTION OF THE ILLUSTRATED EMBODIMENTS

Figure 1:
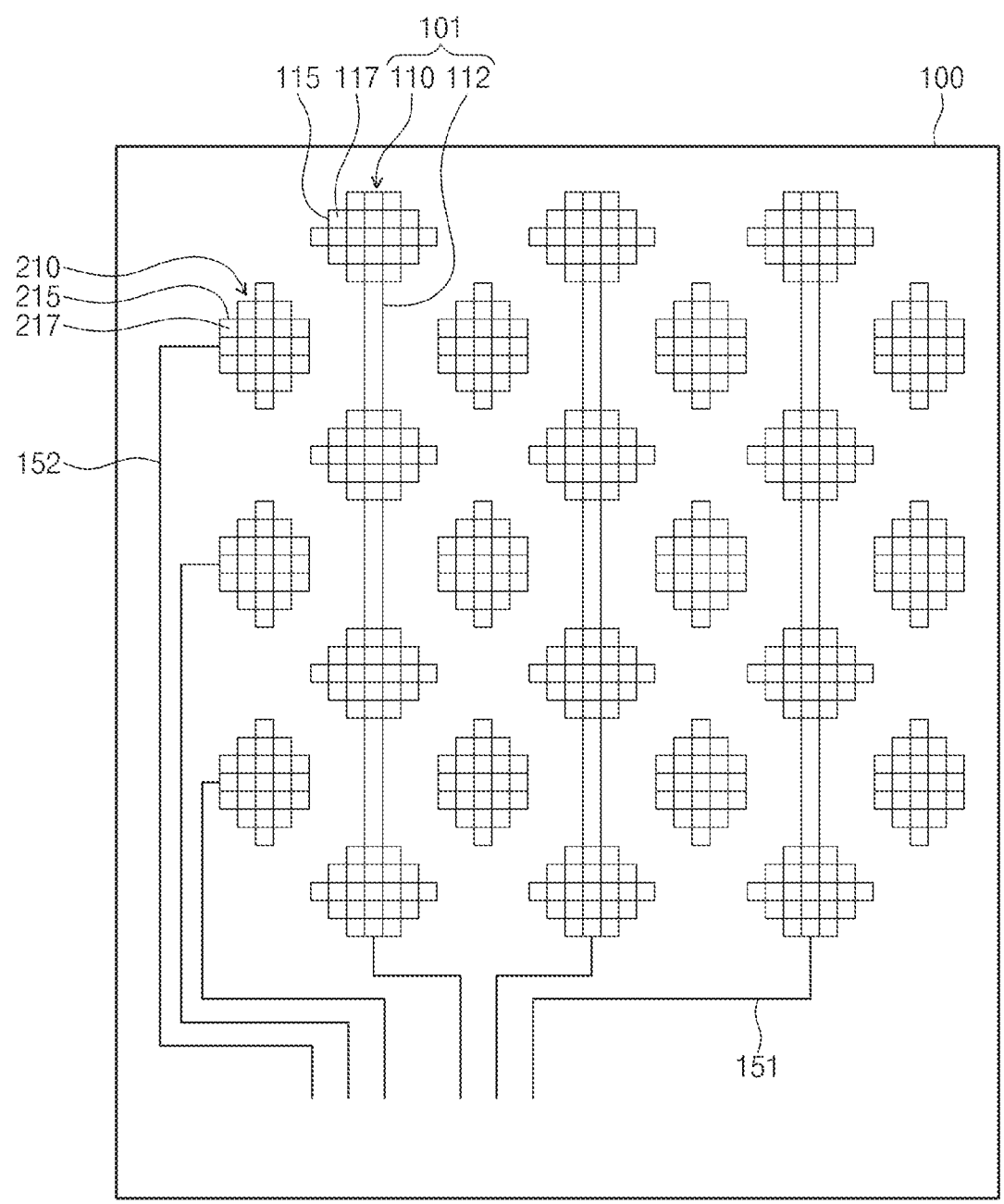
FIGS. 1 and 2 are views of a touch panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
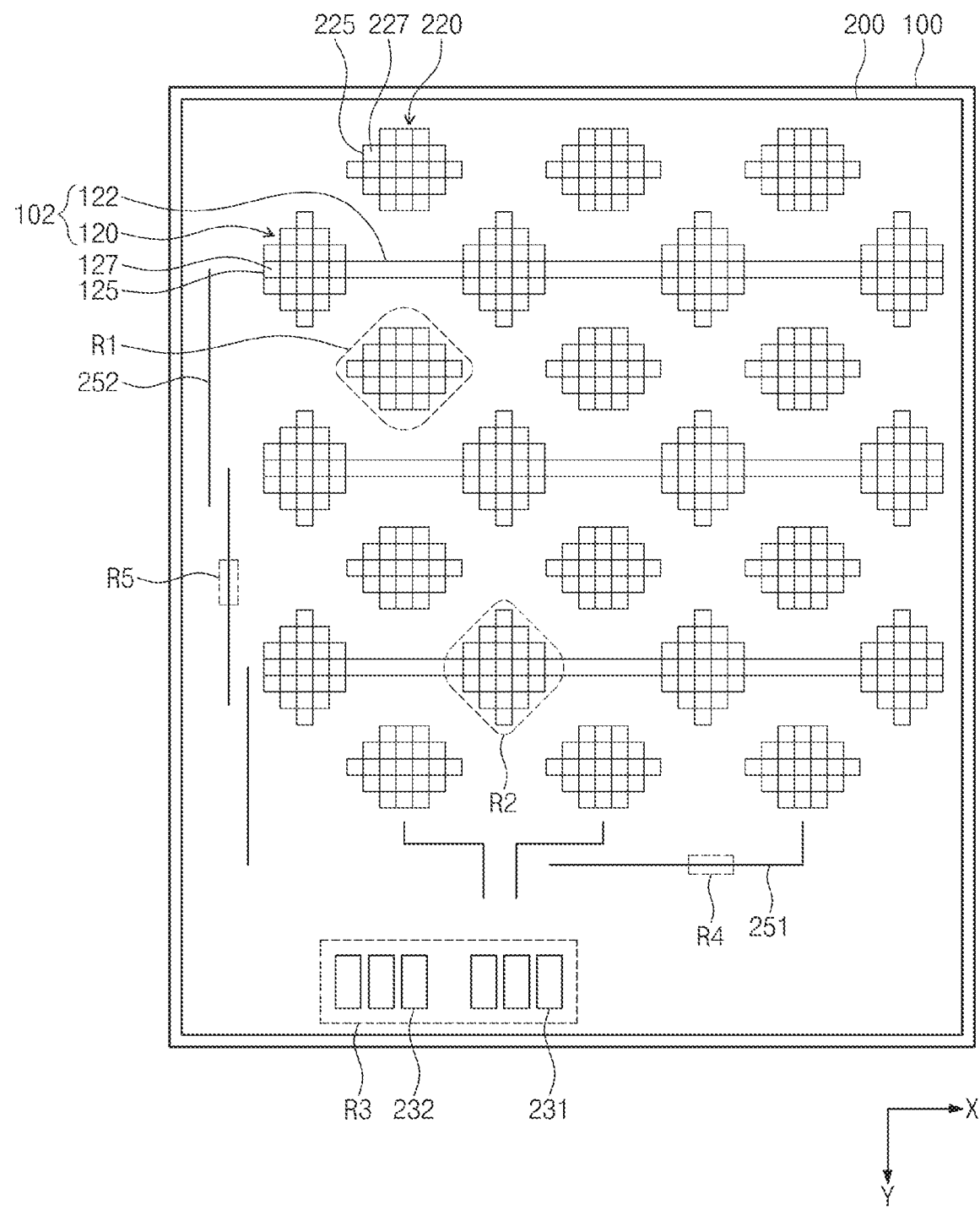

FIGS. 1 and 2 are views of a touch panel according to an exemplary embodiment of the inventive concept. FIG. 1 illustrates components that exist on a substrate 100 and FIG. 2 illustrates components that exist on an insulation layer 200. For convenience FIGS. 1 and 2 are discussed together.

Referring to FIGS. 1 and 2, the touch panel according to an exemplary embodiment may include a substrate 100, first touch electrodes 101, an insulation layer 200, second touch electrodes 102, first auxiliary mesh electrodes 210, and second auxiliary mesh electrodes 220.

The first touch electrode 101 and the first auxiliary mesh electrodes 210 are disposed on the substrate 100. The substrate 100 may be formed of various materials. For example, the substrate 100 may be formed of an insulation material such as glass or a resin. Also, the substrate 100 may be formed of a flexible material (i.e., a material that bends or folds). The substrate 100 may have a single-layered structure or multi-layered structure.

To implement a touch screen function, a touch panel according to an exemplary embodiment may be coupled to a display panel for displaying an image.

In an exemplary embodiment, the substrate 100 is attached to the display panel. In general, the substrate 100 may be an encapsulation thin film that is used in the display panel. The substrate 100 may also be transparent to transmit light.

The first touch electrodes 101 may be disposed lengthwise in a first direction (i.e., a Y-axis direction) and may be arranged on the substrate 100 in a second direction (i.e., an X-axis direction) crossing the first direction. For example, each of the first touch electrodes 101 include first mesh patterns 110 that are arranged on the substrate 100 in the first direction. Here, the first mesh patterns 110 may be electrically connected to each other. More specifically, the first touch electrodes 101 may include first connection patterns 112 that are disposed on the substrate 100 to connect the first mesh patterns 110 to each other. Each of the first mesh patterns 110 may have a mesh shape having openings 117. The first mesh pattern 110 may be defined by metal lines 115, each of which has a thin width.

The first touch electrodes 101 may be formed of various conductive materials. For example, the first touch electrodes 101 may be formed of an opaque metal material such as silver (Ag), aluminum (Al), copper (Cu), chromium (Cr), nickel (Ni), or molybdenum (Mo).

The insulation layer 200 may be spread widely above the substrate 100. Thus, the insulation layer 200 may be disposed on the first touch electrodes 101. The insulation layer 200 may be disposed on other components (i.e., the first auxiliary mesh electrodes 210, first trace lines 151, and second trace lines 152) that are disposed on the substrate 100. The insulation layer 200 may be formed of various insulation materials such as silicon oxide ($SiO_x$) and silicon nitride ($SiN_x$).

The second touch electrodes 102 may be disposed lengthwise in the second direction (i.e., the X-axis direction) and may be arranged on the insulation layer 200 in the first direction (i.e., the Y-axis direction) crossing the second direction. For example, each of the second touch electrodes 102 may include second mesh patterns 120 that are arranged on the insulation layer 200 in the second direction. Here, the second mesh patterns 120 may be electrically connected to each other. More specifically, the second touch electrodes 102 may further include second connection patterns 122 that are disposed on the insulation layer 200 to connect the second mesh patterns 120 to each other. Each of the second mesh patterns 120 may have a mesh shape having openings 127. The second mesh pattern 120 may be defined by metal lines 125, each of which has a thin width.

The second touch electrodes 102 may be formed of various conductive materials. For example, the second touch electrodes 102 may be formed of an opaque metal material such as Ag, Al, Cu, Cr, Ni, or Mo.

The first auxiliary mesh electrodes 210 may be disposed on the substrate 100. The first auxiliary mesh electrodes 210 may be electrically connected to at least a portion of the second mesh patterns 120 that are disposed on the insulation layer 200, respectively. For example, a first auxiliary mesh electrode 210 may be disposed under the second mesh pattern 120 such that it is electrically connected to the second mesh pattern 120. Thus, some second mesh patterns 120 and first auxiliary mesh electrodes 210 are electrically connected to each other and may overlap each other.

FIG. 2 illustrates an exemplary embodiment in which all of the second mesh patterns 120 and the first auxiliary mesh electrodes 210 are electrically connected to each other. In this case, the touch panel may have the same number of the second mesh patterns 120 and the first auxiliary mesh electrodes 210. In an alternate embodiment, only some (i.e., not all) of the second mesh patterns 120 may be electrically connected to the first auxiliary mesh electrodes 210. In this case, the number of second mesh patterns 120 may be different from the number of first auxiliary mesh electrodes 210.

Each of the second touch electrodes 102 may decrease in resistance, thereby improving the RC delay because the touch panel includes the first auxiliary mesh electrodes 210.

Each of the first auxiliary mesh electrodes 210 may have a mesh shape having openings 217. The first auxiliary mesh electrodes 210 may be defined by metal lines 215, each of which has a thin width. The first auxiliary mesh electrodes 210 may be formed of various conductive materials. For example, the first auxiliary mesh electrodes 210 may be formed of an opaque metal material such as Ag, Al, Cu, Cr, Ni, or Mo.

To simply manufacturing, the first mesh patterns 110, the first connection patterns 112, and the first auxiliary mesh electrodes 210 are disposed on the same substrate 100 and may be formed of the same material.

The second auxiliary mesh electrodes 220 may be disposed on the insulation layer 200. The second auxiliary mesh electrodes 220 may be electrically connected to some of the first mesh patterns 110 that are disposed on the substrate 100. For example, the second auxiliary mesh electrode 220 may be disposed on the first mesh pattern 110 to electrically connect to the first mesh pattern 110. Thus, some first mesh patterns 110 and second auxiliary mesh electrodes 220 are electrically connected to each other may and overlap each other.

FIG. 2 illustrates an exemplary embodiment in which all of the first mesh patterns 110 and the second auxiliary mesh electrodes 220 are electrically connected to each other. In this case, the touch panel may include the same number of the first mesh patterns 110 and the second auxiliary mesh electrodes 220. In an alternate embodiment, only some of the first mesh patterns 110 may be electrically connected to the second auxiliary mesh electrodes 220. In this case, the number of first mesh patterns 110 may be different from the number of second auxiliary mesh electrodes 220.

Each of the first touch electrodes 101 may decrease in resistance, thereby improving the RC delay because the touch panel includes the second auxiliary mesh electrodes 220.

Each of the second auxiliary mesh electrodes 220 may have a mesh shape having openings 227. The second auxiliary mesh electrodes 220 may be defined by metal lines 225, each of which has a thin width. The second auxiliary mesh electrodes 220 may be formed of various conductive materials. For example, the second auxiliary mesh electrodes 220 may be formed of an opaque metal material such as Ag, Al, Cu, Cr, Ni, or Mo.

To simplify manufacturing, the second mesh patterns 120, the second connection patterns 122, and the second auxiliary mesh electrodes 220 may be disposed on the same insulation layer 200 and formed of the same material. The first touch electrodes 101 and the second touch electrodes 102 may be formed of the same material or materials different from each other. The first mesh patterns 110 and the second mesh patterns 120 may be formed of the same material or materials different from each other.

Figure 3:
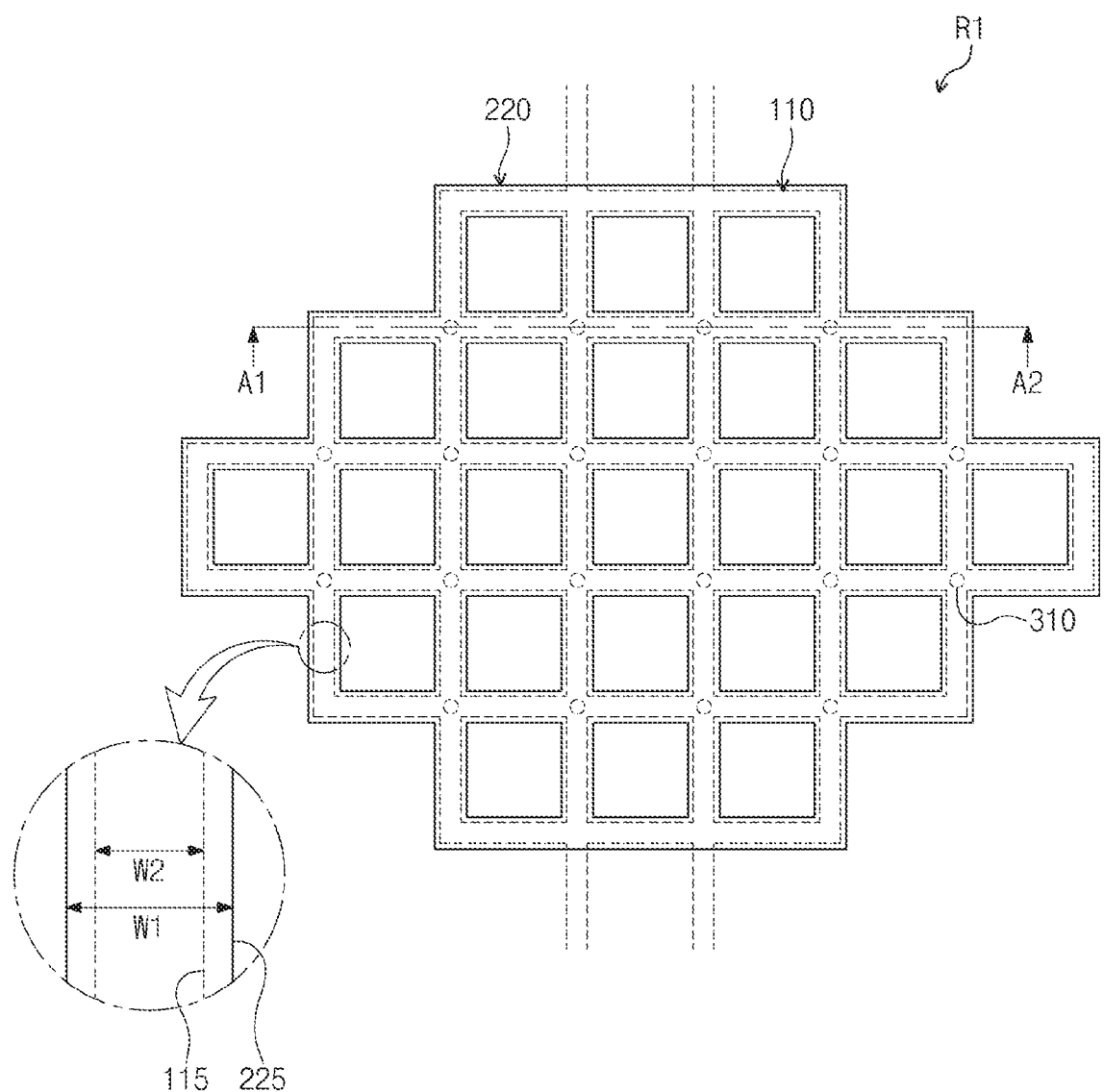
FIG. 3 is an enlarged view of a region R1 of FIG. 2.
Figure 4:
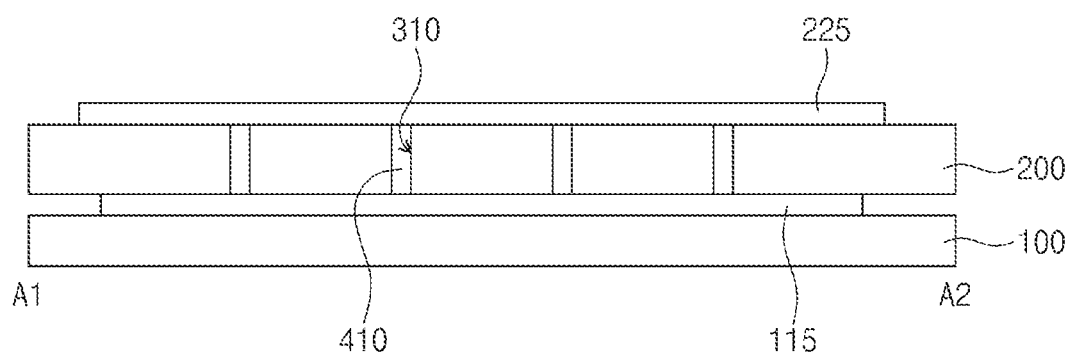
FIG. 4 is a cross-sectional view taken along sectional line A1-A2 of FIG. 3.

FIG. 3 is an enlarged view of a region R1 of FIG. 2. FIG. 4 is a cross-sectional view taken along sectional line A1-A2 of FIG. 3. FIGS. 3 and 4 illustrate a connection structure between the first mesh pattern 110 and the second auxiliary mesh electrode 220. FIG. 3 illustrates the first mesh pattern 110 as a dotted line and the second auxiliary mesh electrode 220 as a solid line for clarity.

Referring to FIGS. 3 and 4, the touch panel may further include first contact patterns 410 according to an exemplary embodiment. The insulation layer 200 may include first contact holes 310.

The first contact holes 310 may be defined above the first mesh patterns 110. For example, as illustrated in FIG. 3, the first contact holes 310 may be disposed between intersection points of the metal lines 115 of the first mesh pattern 110 and intersection points of the metal lines 225 of the second auxiliary mesh electrode 220.

The first contact patterns 410 may connect a portion of the first mesh patterns 110 to the second auxiliary mesh electrodes 220 through the first contact holes 310 defined in the insulation layer 200. For example, as illustrated in FIG. 4, the first contact patterns 410 may electrically connect the metal lines 115 of the first mesh pattern 110 to the metal lines 225 of the second auxiliary mesh electrode 220 through the first contact holes 310 defined above the first mesh pattern 110. The first contact patterns 410 may be integrated with the second auxiliary mesh electrode 220. Also, the first contact holes 310 may variously change in position and number.

To avoid moiré due to misalignment, each of the metal lines 225 of the second auxiliary mesh electrodes 220 may have a width W1 different from a width W2 of each of the metal lines 115 of the first mesh patterns 110. As illustrated in FIG. 3, each of the metal lines 225 of the second auxiliary mesh electrodes 220 may have the width W1 greater than the width W2 of each of the metal lines 115 of the first mesh patterns 110.

Figure 5:
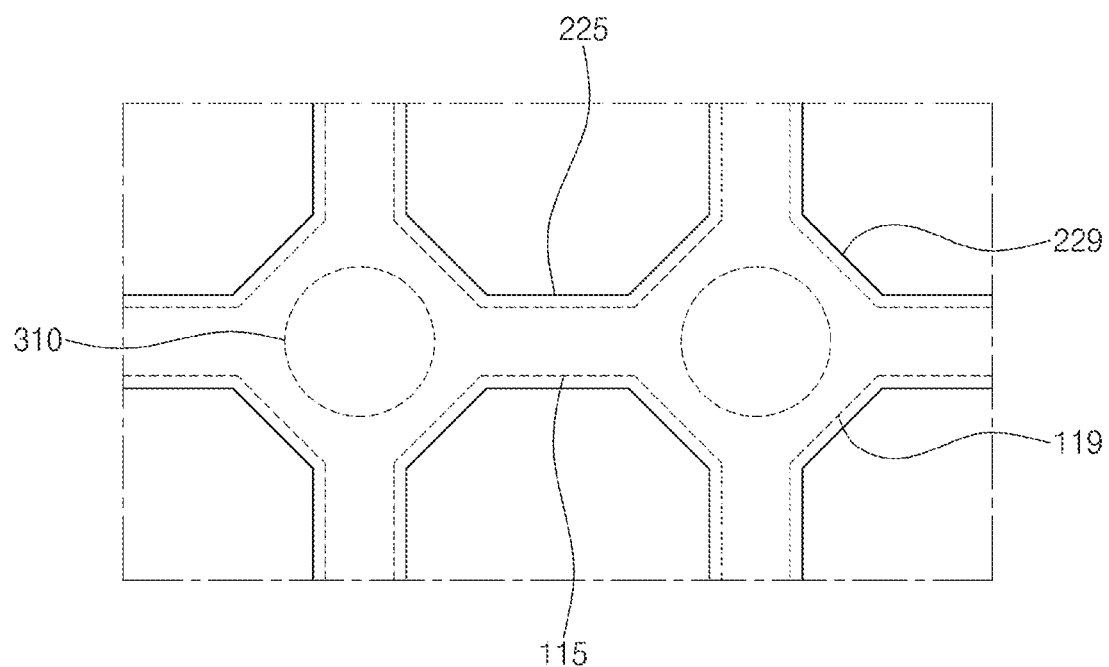
FIG. 5 is a view of an expansion part according to an exemplary embodiment.

FIG. 5 is a view of an expansion part according to an exemplary embodiment. Similar to FIG. 3, FIG. 5 illustrates the first mesh pattern 110 is as a dotted line and the second auxiliary mesh electrode 220 as a solid line.

Referring to FIG. 5, each of the second auxiliary mesh electrodes 220 may further include an expansion part 229 that extends outward from each of the intersection points of the metal lines 225 according to an exemplary embodiment. Thus, the metal lines 225 may have an increased area at intersection points. As a result, even when misalignment occurs, the expansion part 229 of the second auxiliary mesh electrodes 220 enables the contact between the first mesh patterns 110 and the seconded auxiliary mesh electrodes 220.

In an exemplary embodiment, each of the first mesh patterns 110 may further include an expansion part 119 that extends outward from each of the intersection points of the metal lines 115. Thus, the metal lines 115 may have an increased area at intersection points. As a result, even when misalignment occurs, the expansion part 119 of the first mesh patterns 110 enables between the first mesh patterns 110 and the second auxiliary mesh electrodes 220.

In an exemplary embodiment, the increased areas of the metal lines 115 and 225 due to the expansion parts 229 and 119 allow each of the first contact holes 310 to increase in size. Thus, the touch panel may include a wider contact area between the first mesh pattern 110 and the second auxiliary mesh electrode 220 than conventional touch panels or touch panels without expansion parts 229 and 119.

Figure 6:
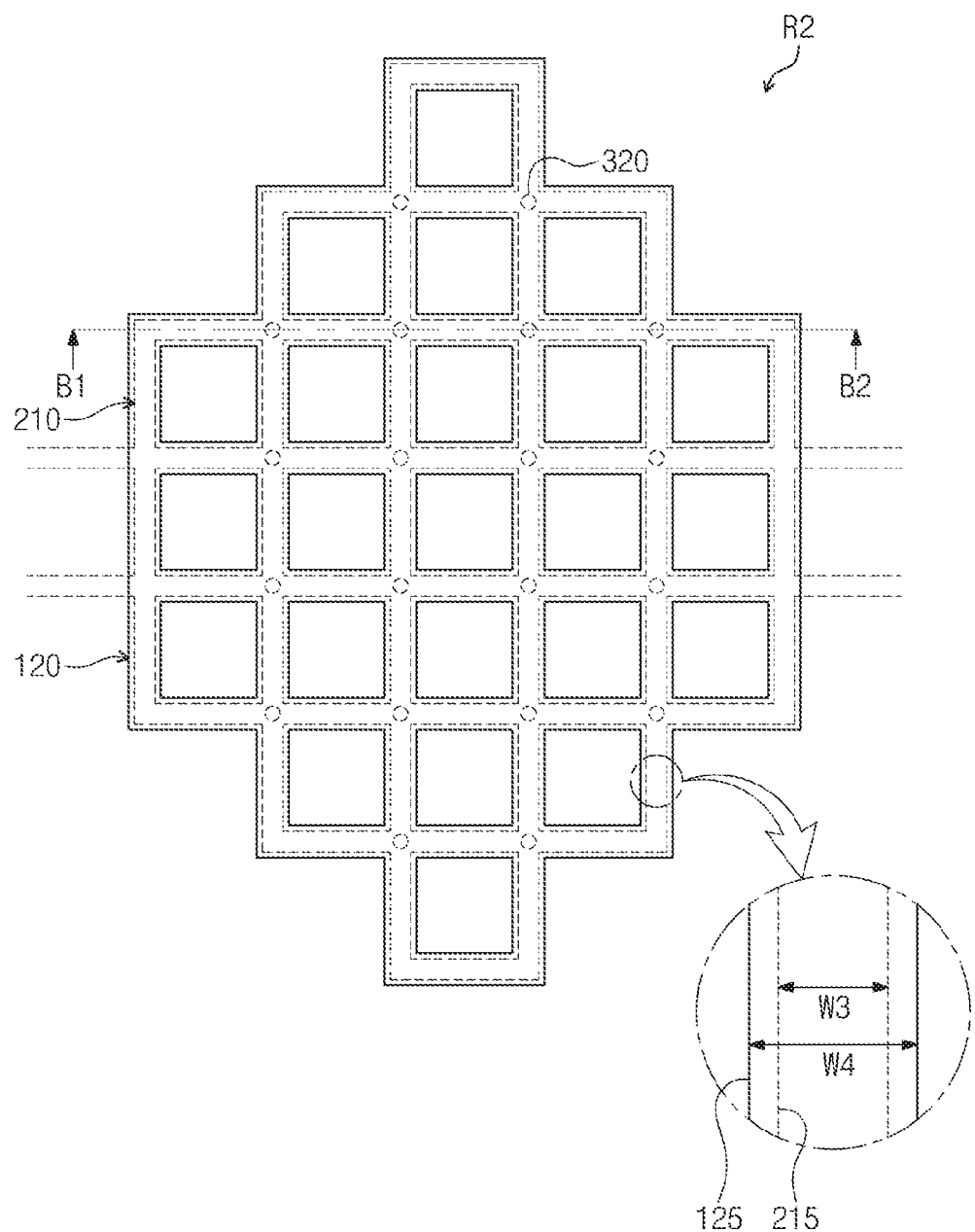
FIG. 6 is an enlarged view of a region R2 of FIG. 2.
Figure 7:
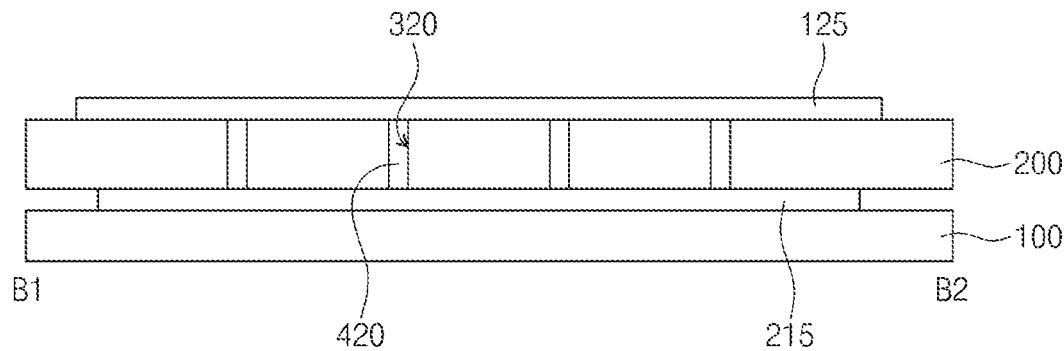
FIG. 7 is a cross-sectional view taken along sectional line B1-B2 of FIG. 6.

FIG. 6 is an enlarged view of a region R2 of FIG. 2. FIG. 7 is a cross-sectional view taken along sectional line B1-B2 of FIG. 6. FIGS. 6 and 7 illustrate a connection structure between the second mesh pattern 120 and the first auxiliary mesh electrode 210. For clarity, FIG. 6 illustrates the second mesh pattern 120 as a solid line and the first auxiliary mesh electrode 210 as a dotted line.

In an exemplary embodiment, FIGS. 6 and 7 illustrate the touch panel further include second contact patterns 420. The insulation layer 200 may include second contact holes 320.

The second contact holes 320 may be defined above the first auxiliary mesh electrodes 210. For example, as illustrated in FIG. 6, the second contact holes 320 may be disposed between intersection points of the metal lines 215 of the first auxiliary mesh electrode 210 and intersection points of the metal lines 125 of the second mesh pattern 120.

The second contact patterns 420 may connect at least a portion of the second mesh patterns 120 to the first auxiliary mesh electrodes 210 through the second contact holes 320 defined in the insulation layer 200. For example, as illustrated in FIG. 7, the second contact patterns 420 may electrically connect the metal lines 125 of the second mesh pattern 120 to the metal lines 215 of first auxiliary mesh electrode 210 through the second contact holes 320 defined above the first auxiliary mesh electrode 210. The second contact patterns 420 may be integrated with the second mesh pattern 120. Also, the second contact holes 320 may variously change in position and number.

To avoid moiré due to the misalignment, each of the metal lines 215 of the first auxiliary mesh electrodes 210 may have a width W3 different from a width W4 of each of the metal lines 125 of the second mesh patterns 120. As illustrated in FIG. 6, each of the metal lines 215 of the first auxiliary mesh electrodes 210 may have the width W3 less than the width W4 of each of the metal lines 125 of the second mesh patterns 120.

Although not shown, the second mesh patterns 120 may further include an expansion part (not shown) that extends outward from each of the intersection points of the metal lines 125, like expansion part 119 of the first mesh pattern 110 of FIG. 5. Also, the first auxiliary mesh electrodes 210 may further include an expansion part (not shown) that extends outward form each of the intersection points of the metal lines 215, like expansion part 229 of the second auxiliary mesh electrode 220 of FIG. 5.

When the touch panel according to an exemplary embodiment is coupled to the display panel, pixels (not shown) of the display panel may be disposed to overlap openings 117 and 127 of the mesh patterns 110 and 120 and openings 217 and 227 of the auxiliary mesh electrodes 210 and 220 (FIGS. 1 and 2), respectively. Thus, light emitted from the pixels may not be blocked by the mesh patterns 110 and 120 and the auxiliary mesh electrodes 210 and 220. Here, at least one pixel may be disposed within each of the openings 117 and 127 of the mesh patterns 110 and 120.

Figure 8:
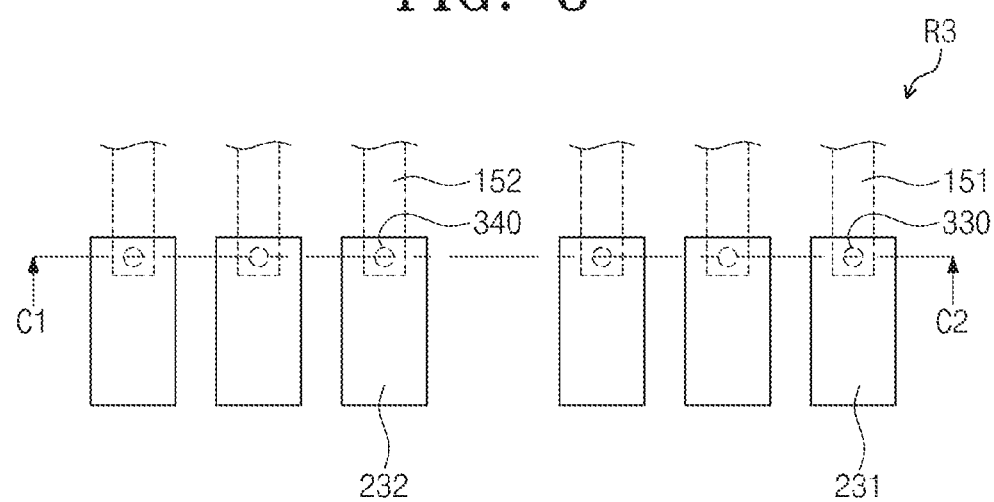
FIG. 8 is an enlarged view of a region R3 of FIG. 2.
Figure 9:
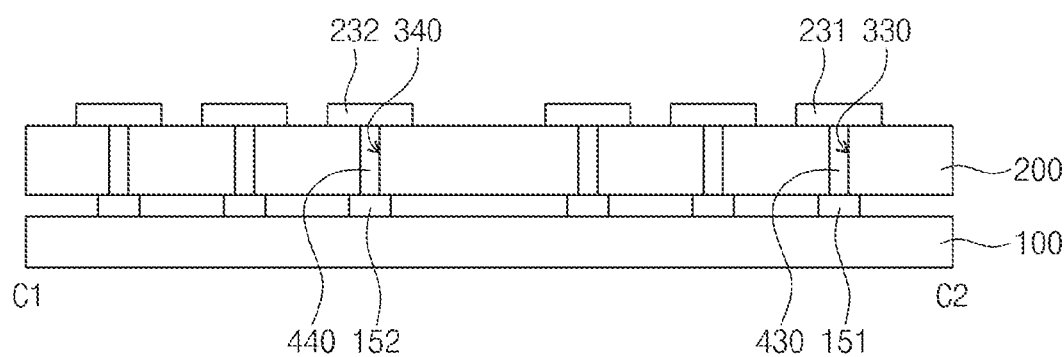
FIG. 9 is a cross-sectional view taken along sectional line C1-C2 of FIG. 8.

FIG. 8 is an enlarged view of a region R3 of FIG. 2. FIG. 9 is a cross-sectional view taken along sectional line C1-C2 of FIG. 8.

Referring to FIGS. 1, 2, 8, and 9, the touch panel may include first trace lines 151, first pads 231, second pads 232, third contact patterns 430, and fourth contact patterns 440.

Referring to FIG. 1, the first trace lines 151 may be disposed on the substrate 100. The first trace lines 151 may be electrically connected to the corresponding first touch electrodes 101. For example, the first trace lines 151 may be disposed on an outer region of the substrate 100. As shown in FIGS. 1 and 8, each of the first trace lines 151 may have an end connected to the outer first mesh patterns 110 of each of the first touch electrodes 101 and the other end extending to the first pads 231.

Referring to FIG. 1, the second trace lines 152 may be disposed on the substrate 100. The second trace lines 152 may be electrically connected to corresponding second touch electrodes 102. For example, the second trace lines 152 may be disposed on an outer region of the substrate 100. As shown in FIGS. 1, 2, 7, and 8, the second trace lines 152 may be electrically connected to the second touch electrodes 102 disposed on the insulation layer 200 through the first auxiliary mesh electrodes 210 and the second contact patterns 420. More specifically, each of the second trace lines 152 may have an end connected to the outer first auxiliary mesh electrodes 210 and the other end extending to the second pads 232.

To simplify manufacturing, the first mesh patterns 110, the first auxiliary mesh electrodes 210, the first trace lines 151, and the second trace lines 152 may be formed of the same material.

The insulation layer 200 may include third contact holes 330 and fourth contact holes 340. Each of the third contact holes 330 may be disposed on the other end of each of the first trace lines 151. For example, the third contact holes 330 may be disposed on regions where the first trace lines 151 and the first pads 231 overlap each other.

Each of the fourth contact holes 340 may be disposed on the other end of each of the second trace lines 152. For example, the fourth contact holes 340 may be disposed on regions where the second trace lines 152 and the second pads 232 overlap each other.

The first pads 231 and the second pads 232 may be disposed on the insulation layer 200. For example, the first pads 231 and the second pads 232 may be disposed on an outer region of the insulation layer 200.

The first pads 231 may be connected to the other corresponding ends of the first trace lines 151 through the third contact patterns 430. Also, the second pads 232 may be connected to the other corresponding ends of the second trace lines 152 through the fourth contact patterns 440. The third contact patterns 430 may connect the first pads 231 to the corresponding first trace lines 151 through the third contact holes 330 defined in the insulation layer 200. Also, the third contact patterns 430 may be integrated with the first pads 231. The fourth contact patterns 440 may connect the second pads 232 to the corresponding second trace lines 152 through the fourth contact holes 340 defined in the insulation layer 200. Also, the fourth contact patterns 440 may be integrated with the second pads 232.

Figure 10:
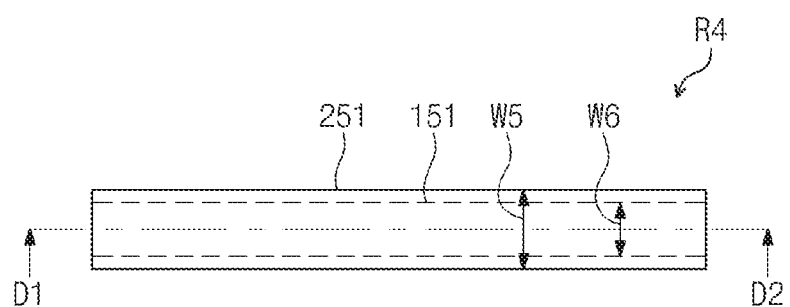
FIG. 10 is an enlarged view of a region R4 of FIG. 2.
Figure 11A:
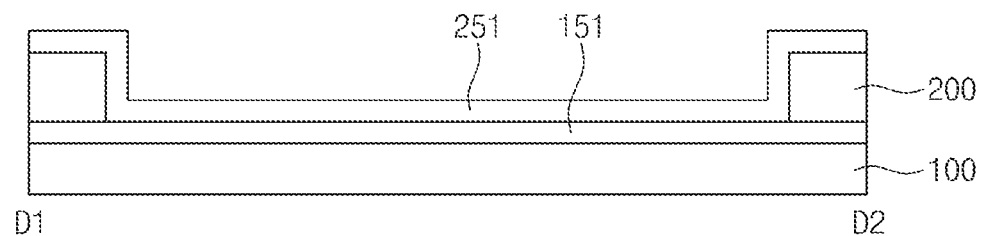
FIGS. 11A and 11B are cross-sectional views taken along sectional line D1-D2 of FIG. 10.
Figure 11B:
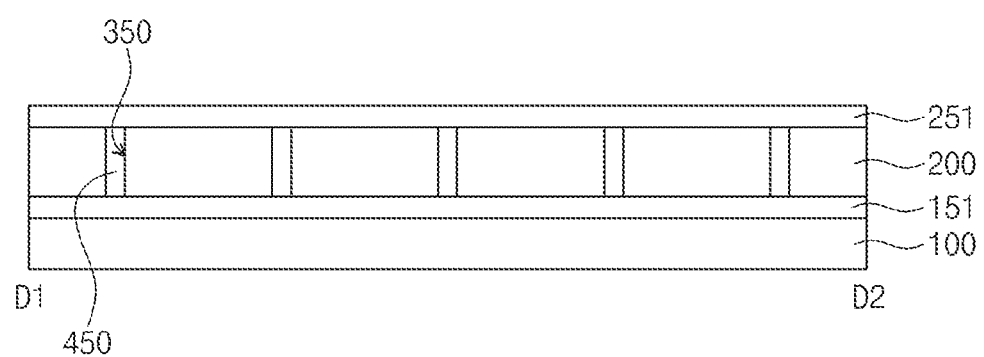

FIG. 10 is an enlarged view of a region R4 of FIG. 2. FIGS. 11A and 11B are cross-sectional views taken along sectional line D1-D2 of FIG. 10. However, FIGS. 11A and 11B illustrate different examples.

Referring to FIGS. 2, 10, 11A, and 11B, the touch panel may further include first auxiliary lines 251 according to an exemplary embodiment. The first auxiliary lines 251 may be disposed on the insulation layer 200. For example, the first auxiliary lines 251 may be disposed on an outer region of the insulation layer 200. The first auxiliary lines 251 may be electrically connected to the corresponding first trace lines 151. Each of the first trace lines 151 may decrease in resistance thereby improving the RC delay because the touch panel includes first auxiliary lines 251. As illustrated in FIG. 11A, the first auxiliary line 251 may be disposed above the first trace line 151 and directly connected to the first trace line 151. For example, at least a portion of the first auxiliary line 251 may directly contact a top surface of the first trace line 151.

In an alternate embodiment, FIG. 11B illustrates the first auxiliary lines 251 are connected to the first trace lines 151 through fifth contact holes 350 and fifth contact patterns 450. Thus, the insulation layer 200 may include fifth contact holes 350 defined above the first trace lines 151. For example, the fifth contact holes 350 may be disposed on regions where the first trace lines 151 and the first auxiliary lines 251 overlap each other. The fifth contact patterns 450 may connect the first trace lines 151 to the corresponding first auxiliary lines 251 through the fifth contact holes 350 defined in the insulation layer 200. Thus, even though the insulation layer 200 is disposed between the first trace lines 151 and the first auxiliary lines 251, the first trace lines 151 and the first auxiliary lines 251 may be electrically connected to each other. Here, at least portions of each of the first trace lines 151 and each of the first auxiliary lines 251 are electrically connected to each other through the fifth contact patterns 450 and may overlap each other.

Each of the first auxiliary lines 251 may have a width W5 different from a width W6 of each of the first trace lines 151. For example, as illustrated in FIG. 10, each of the first auxiliary lines 251 may have the width W5 greater than the width W6 of each of the first trace lines 151.

Figure 12:
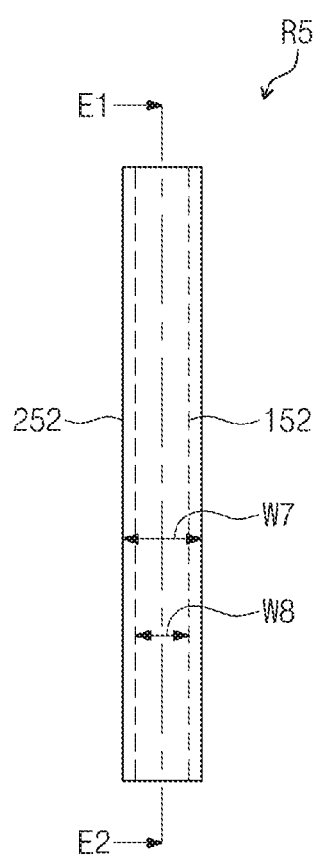
FIG. 12 is an enlarged view of a region R5 of FIG. 2.
Figure 13A:
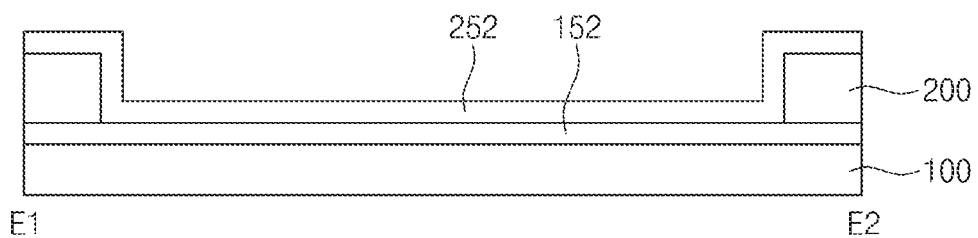
FIGS. 13A and 13B are cross-sectional views taken along sectional line E1-E2 of FIG. 12.
Figure 13B:
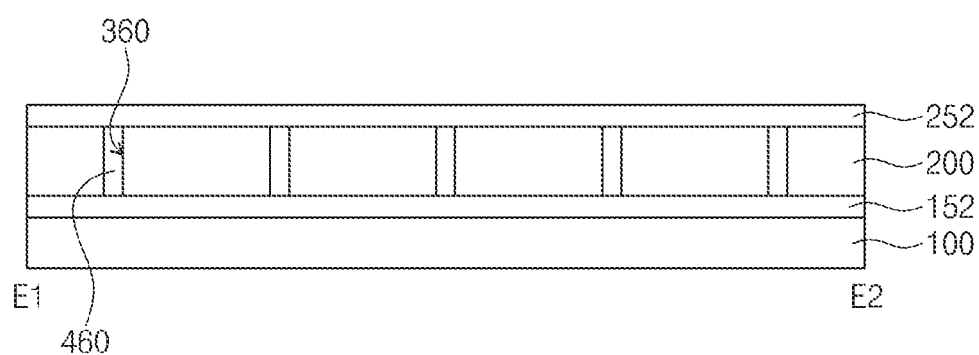

FIG. 12 is an enlarged view of a region R5 of FIG. 2. FIGS. 13A and 13B are cross-sectional views taken along sectional line E1-E2 of FIG. 12. However, FIGS. 13A and 13B illustrate different examples.

Referring to FIGS. 2, 12, 13A, and 13B, the touch panel may further include second auxiliary lines 252 according to an exemplary embodiment. The second auxiliary lines 252 may be disposed on the insulation layer 200. For example, the second auxiliary lines 252 may be disposed on an outer region of the insulation layer 200. The second auxiliary lines 252 may be electrically connected to the corresponding second trace lines 152. Each of the second trace lines 152 may decrease in resistance to thereby improving the RC delay because the touch panel includes second auxiliary lines 252. As illustrated in FIG. 13A, the second auxiliary lines 252 may be disposed above the second trace lines 152 and directly connected to the second trace lines 151. For example, at least a portion of the second auxiliary line 252 may directly contact a top surface of the second trace line 152.

In an alternate embodiment, FIG. 13B illustrates the second auxiliary lines 252 may be connected to the corresponding second trace lines 152 through sixth contact holes 360 and sixth contact patterns 460. Thus, the insulation layer 200 may include sixth contact holes 360 defined above the second trace lines 152. For example, the sixth contact holes 360 may be disposed on regions where the second trace lines 152 and the second auxiliary lines 252 overlap each other. The sixth contact patterns 460 may connect the second trace lines 152 to the corresponding second auxiliary lines 252 through the sixth contact holes 360 defined in the insulation layer 200. Thus, even though the insulation layer 200 is disposed between the second trace lines 152 and the second auxiliary lines 252, the second trace lines 152 and the second auxiliary lines 252 may be electrically connected to each other. Here, at least portions of each of the second trace lines 152 and each of the second auxiliary lines 252 are electrically connected to each other through the sixth contact patterns 460 and may overlap each other.

Each of the second auxiliary lines 252 may have a width W7 different from a width W8 of each of the second trace lines 152. As FIG. 12 illustrates, each of the second auxiliary lines 252 have the width W7 greater than that W8 of each of the second trace lines 152.

To simplify manufacturing, the second mesh patterns 120, the second auxiliary mesh electrodes 220, the first auxiliary lines 251, and the second auxiliary lines 252 may be formed of the same material. The first auxiliary lines 251 and the first trace lines 151 may be formed of the same material or materials different from each other. The second auxiliary lines 252 and the second trace lines 152 may be formed of the same material or materials different from each other.

Figure 14:
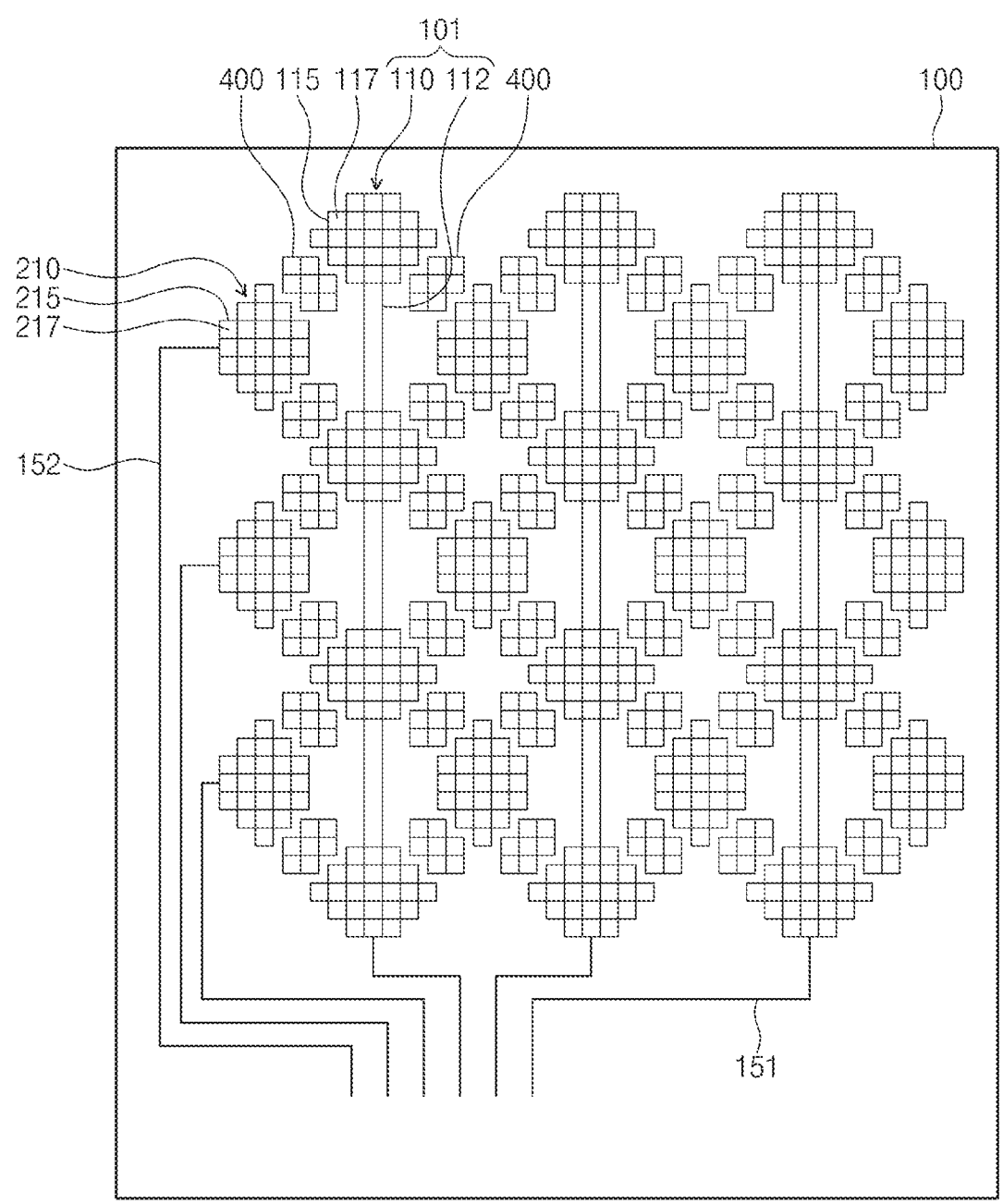
FIG. 14 is a view of dummy patterns according to an exemplary embodiment.
Figure 14:
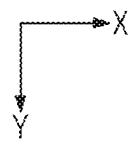

FIG. 14 is a view of dummy patterns according to an exemplary embodiment.

Referring to FIG. 14, the touch panel may include dummy patterns 400 according to an exemplary embodiment.

There are differences in features such as reflectivity, transmittance, and the like between a region where the first mesh patterns 110 and the first auxiliary mesh electrodes 210 exist and a region on which the first mesh patterns 110 and the first auxiliary mesh electrodes 210 do not exist. Thus, to realize the uniformity in features, dummy patterns 400 may be disposed between the first mesh patterns 110 and the first auxiliary mesh electrodes 210.

The dummy patterns 400 may be disposed on the substrate 100 and be in an electrically floated state. Thus, each of the dummy patterns 400 may be spaced a predetermined distance from each of the first mesh patterns 110 and the first auxiliary mesh electrodes 210. Also, each of the dummy patterns 400 may have a mesh shape (i.e., similar to the first mesh patterns 110).

Figure 15:
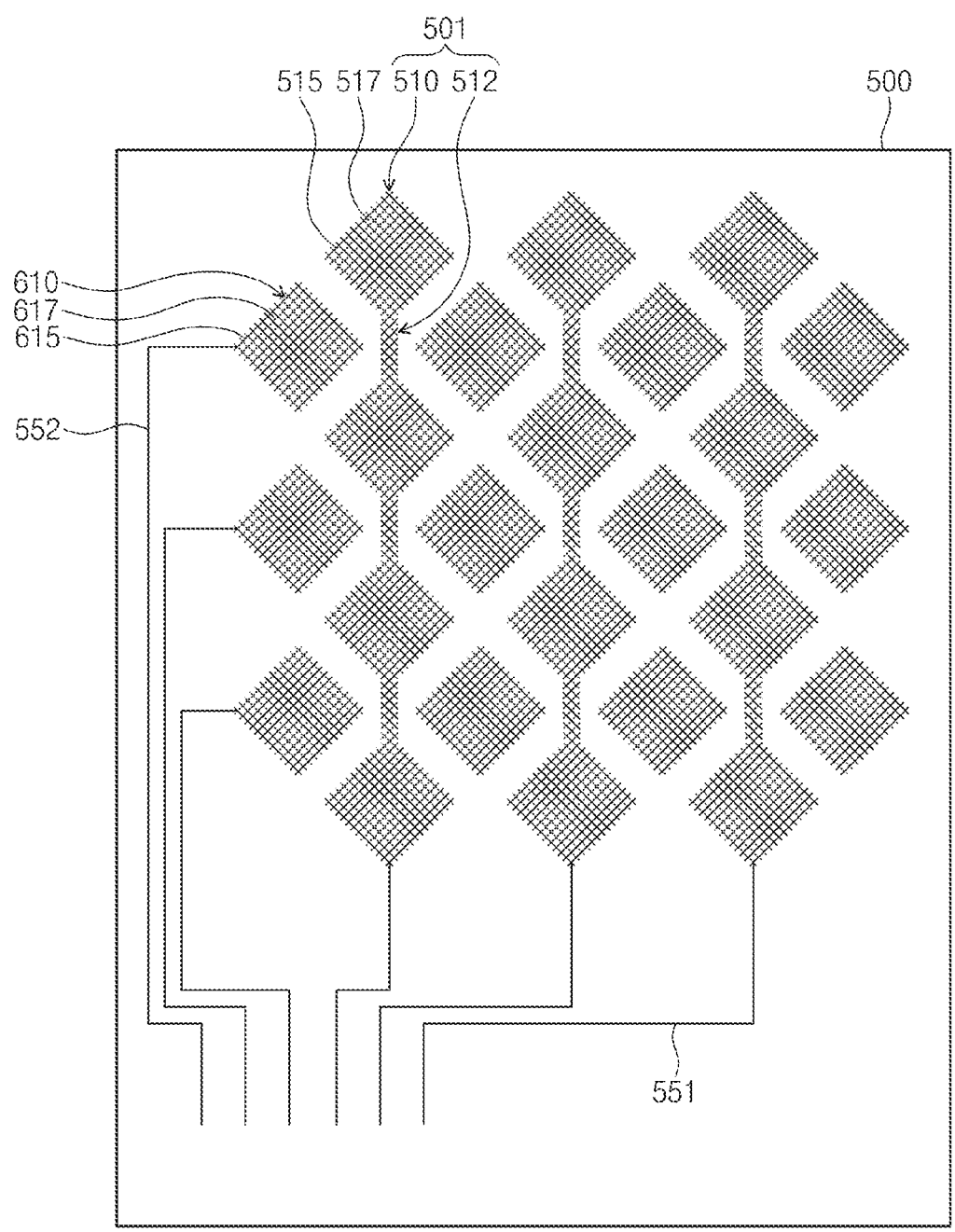
FIGS. 15 and 16 are views of a touch panel according to an exemplary embodiment.
Figure 16:
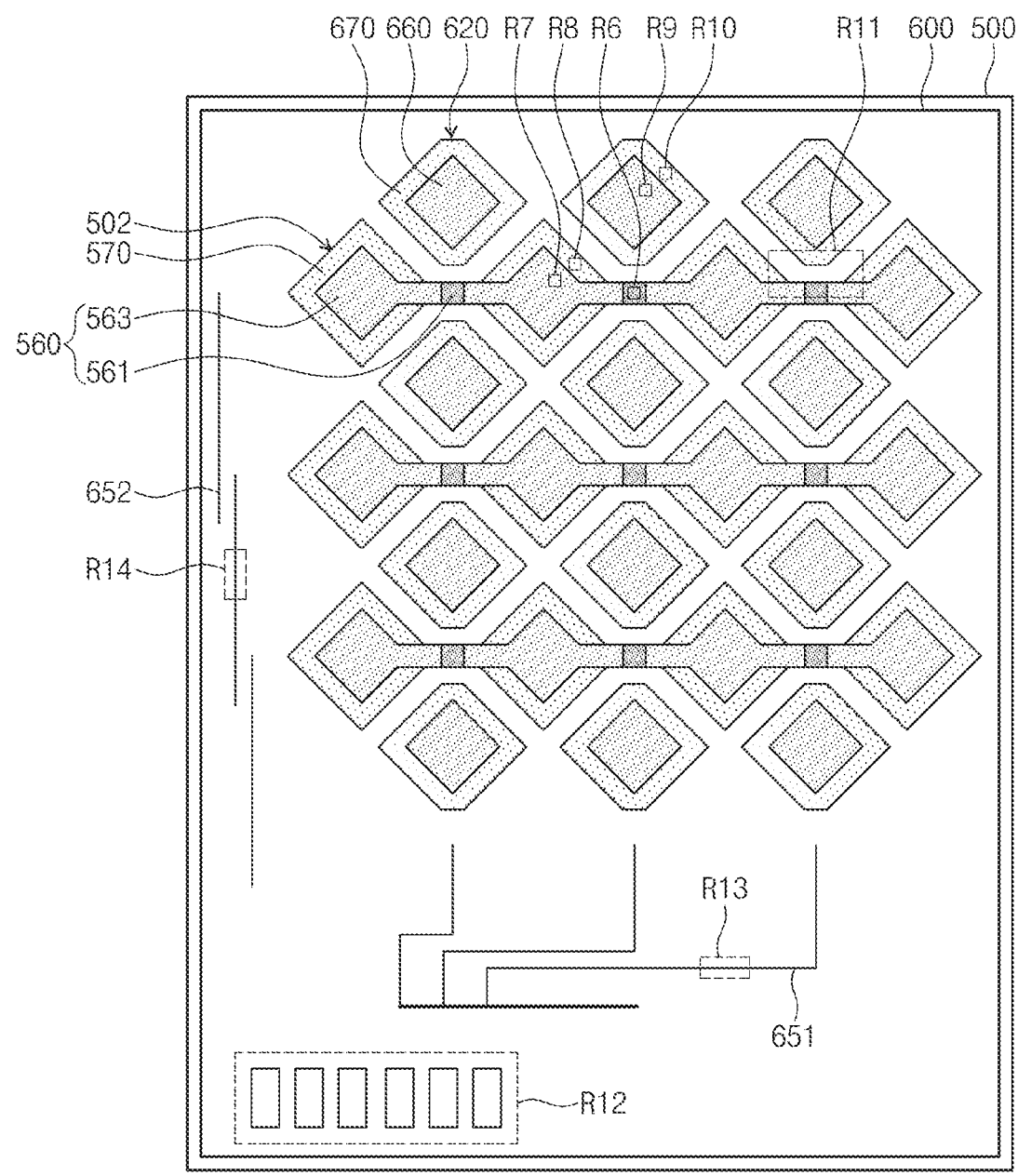

FIGS. 15 and 16 are views of a touch panel according to an exemplary embodiment. FIG. 15 illustrates components that exist on a substrate 500 and FIG. 16 illustrates components that exist on an insulation layer 600. For convenience of the reader, FIGS. 15 and 16 are discussed together.

Referring to FIGS. 15 and 16, the touch panel according to an exemplary embodiment may include the substrate 500, first touch electrodes 501, the insulation layer 600, second touch electrodes 502, first auxiliary electrodes 610, and second auxiliary electrodes 620.

The first touch electrodes 501 and the first auxiliary electrodes 610 may be disposed on the substrate 500.

The substrate 500 may be formed of various materials. The substrate 500 may be formed of an insulation material such as glass or a resin. Also, the substrate 500 may be formed of a flexible material (i.e., a material that bends or folds). The substrate 500 may have a single-layered structure or multi-layered structure. Also, the substrate 500 may be transparent to transmit light.

To implement a touch screen function, the touch panel may be coupled to a display panel (not shown) for displaying an image. The touch panel may be classified into an outcell type touch panel, an on-cell type touch panel, and an in-cell type touch panel according to the coupling method between the touch panel and the display panel.

In the outcell type touch panel, the substrate 500 may be attached to the display panel. In the on-cell type touch panel, the substrate 500 may be an encapsulation thin film that is used in the display panel. In the in-cell type touch panel, the substrate 500 may be one layer within the display panel.

The first touch electrodes 501 may be disposed lengthwise in a first direction (i.e., a Y-axis direction) and may be arranged on the substrate 500 in a second direction (i.e., an X-axis direction) crossing the first direction. For example, each of the first touch electrodes 501 may include mesh patterns 510 that are arranged on the substrate 500 in the first direction. Here, the mesh patterns 510 may be electrically connected to each other. For example, the first touch electrodes 501 may further include connection patterns 512 that are disposed on the substrate 500 to connect the mesh patterns 510 to each other. Each of the first touch electrodes 501 may have a mesh shape having openings 517. The first touch electrode 501 may be defined by metal lines 515, each of which has a thin width.

Each of the metal lines 515 of the first touch electrodes 501 may have a liner shape extending in a direction that intersects with the first and second directions. For example the metal lines 515 may be diagonal to the first and second directions (i.e. at a 45° angle). The metal lines 515 of the first touch electrodes 501 may be disposed to overlap a display region as well as a non-display region such as a black matrix of the display panel (not shown).

The first touch electrodes 501 may be formed of various conductive materials. For example, the first touch electrodes 501 may be formed of an opaque metal material such as Ag, Al, Cu, Cr, Ni, Mo, or an alloy thereof.

The first auxiliary electrodes 610 may be disposed on the substrate 500. The first auxiliary electrode 610 may be disposed on the same layer as the first touch electrodes 501. The first auxiliary electrodes 610 may be electrically connected to at least a portion of the second touch electrodes 502 that are disposed on the insulation layer 600. Thus, the first auxiliary electrodes 610 may be disposed under the second touch electrodes 502 so that first auxiliary electrodes 610 and the second touch electrodes 502 are electrically connected. Thus, at least portions of each of the second touch electrodes 502 and each of the first auxiliary electrodes 610 are electrically connected to each other and may overlap each other.

Each of the second touch electrodes 502 may decrease in resistance thereby improving RC delay because the touch panel includes first auxiliary electrodes 610.

Each of the first auxiliary electrodes 610 may have a mesh shape having openings 617. The first auxiliary electrode 610 may be defined by metal lines 615, each of which has a thin width. Each of the metal lines 615 of the first auxiliary electrodes 610 may have a liner shape extending in a direction that intersects with the first and second directions (i.e., at a 45° to the first and second direction). The metal lines 615 of the first auxiliary electrodes 610 may be disposed to overlap a display region as well as a non-display region such as a black matrix of the display panel (not shown) on a plane. The first auxiliary electrodes 610 may be formed of various conductive materials. For example, the first auxiliary electrodes 610 may be formed of an opaque metal material such as Ag, Al, Cu, Cr, Ni, Mo, or an alloy thereof.

To simplify manufacturing, the first touch electrodes 501 and the first auxiliary electrodes 610 are disposed on the same substrate 500 and may be formed of the same material.

The insulation layer 600 may be widely spread above the substrate 500. Thus, the insulation layer 600 may be disposed on the first touch electrodes 501. Also, the insulation layer 600 may be disposed on other components (i.e., the first auxiliary electrodes 610, first trace lines 551, and second trace lines 552) that are disposed on the substrate 500. The insulation layer 600 may be formed of various insulation materials such as $SiO_X$ and $SiN_X$.

The second touch electrodes 502 may be lengthily disposed in second direction (i.e., the X-axis direction) and may be arranged on the insulation layer 600 in the first direction (i.e., the Y-axis direction) crossing the second direction. For example, the second touch electrodes 502 may overlap the first auxiliary electrodes 610 that are adjacent to each other in the second direction. The second touch electrodes 502 may include first portions 560 and second portions 570 which have pattern shapes different from each other. The first portions 560 may be disposed on a first region (not shown) and the second portions 570 may be disposed on a second region (not shown).

In FIG. 16, the first region may be a region expressed by the darkest shadow and an intermediate shadow of 3-stage shadows, and the second region may be a region expressed by the lightest shadow.

The first portions 560 may include overlapping portions 561 and connection portions 563. The overlapping portions 561 may overlap the first touch electrodes 501. Specifically, the overlapping portions 561 may overlap the connection patterns 512 shown in FIG. 15.

The connection portions 563 may connect the overlapping portions 561 to each other. Each of the connection portions 563 may overlap a central portion of each of the first auxiliary electrodes 610.

The second portions 570 may be connected to the connection portions 563 and disposed outside the connection portions 563.

The connection portions 563 may be spaced further away from the second auxiliary electrodes 620 that are relatively adjacent to the second touch electrode 502 than the second portions 570 connected to the connection portions 563 on a plane. One of the connection portions 563 and one of the second portions 570 connected to the connection portions 563 may cover one of the first auxiliary electrodes 610.

A structure having the pattern shape of the overlapping portions 561, the connection portions 563, and the second portions 570 will be described.

The second touch electrodes 502 may be formed of various transparent conductive materials. For example, each of the second touch electrodes 502 may be formed of a material such as indium tin oxide (ITO), indium zinc oxide (IZO), or indium gallium zinc oxide (IGZO).

The second auxiliary electrodes 620 may be disposed on the insulation layer 600. The second auxiliary electrodes 620 may be disposed on the same layer as the second touch electrodes 502. The second auxiliary electrodes 620 may be electrically connected to at least a portion of the corresponding mesh patterns 510 that are disposed on the substrate 500. For example, the second auxiliary electrode 620 may be disposed on the mesh pattern 510 such that the second auxiliary electrode 620 is electrically connected to the mesh pattern 510. Thus, at least portions of the specific mesh pattern 510 and second auxiliary electrode 620 which are electrically may overlap each other. Each of the first touch electrodes 501 may decrease in resistance thereby improving the RC delay because the touch panel includes the second auxiliary electrodes 620.

The second auxiliary electrodes 620 adjacent to each other in the first direction may overlap at least a portion of one of the first touch electrodes 501. The second auxiliary electrodes 620 may include third portions 660 and fourth portions 670 which have pattern shapes different from each other.

The third portions 660 may be disposed on a third region (not shown), and the fourth portions 670 may be disposed on a fourth region (not shown). In FIG. 16, the third region is expressed by an intermediate shadow, and the fourth region is expressed by the lightest shadow. Each of the third portions 660 may overlap a central portion of each of the mesh patterns 510. The fourth portions 670 may be connected to the third portions 660 and disposed outside the third portions 660. One of the fourth portions 670 may surround one of the third portions 660. The fourth portions 670 are spaced closer to the second touch electrodes 502 relatively adjacent to the second auxiliary electrode 620 than the third portions 660 connected to the fourth portions 670. One of the third portions 660 and one of the fourth portions 670 connected to the third portions 660 may cover one of the mesh patterns 510.

A structure having the pattern shape of the third portions 660 and the fourth portions 670 will be described.

The second auxiliary electrodes 620 may be formed of various transparent conductive materials. For example, each of the second auxiliary electrodes 620 may be formed of a material such as indium tin oxide (ITO), indium zinc oxide (IZO), or indium gallium zinc oxide (IGZO).

To simplify manufacturing, the second auxiliary electrodes 620 and the second touch electrodes 502 are disposed on the same insulation layer 600 and may be formed of the same material.

Hereinafter, a pattern shape of the second touch electrodes 502 of FIG. 16 according to an exemplary embodiment will be described.

Figure 17:
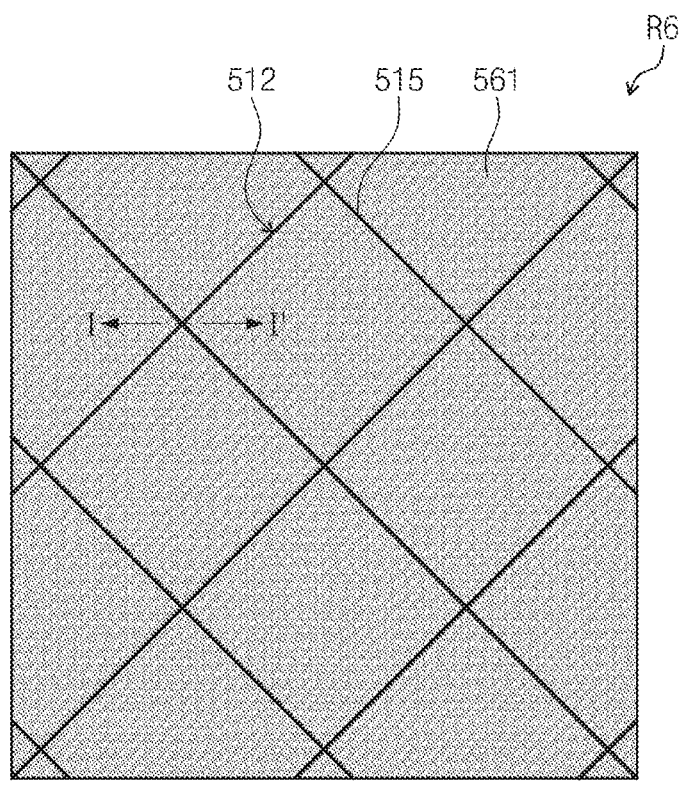
FIG. 17 is an enlarged view of a region R6 of FIG. 16.
Figure 18:
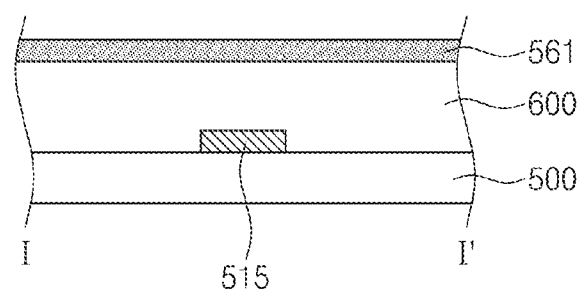
FIG. 18 is a cross-sectional view taken along sectional line I-I' of FIG. 17.

FIG. 17 is an enlarged view of a region R6 of FIG. 16, and FIG. 18 is a cross-sectional view taken along sectional line I-I' of FIG. 17.

Referring to FIGS. 15 to 18, the overlapping portions 561 may cover the connection patterns 512 disposed on the first region and the openings defined by the connection patterns 512 disposed on first region. The overlapping portions 561 may not have openings to minimize resistance, thereby reducing the RC delay of the second touch electrodes 502.

The insulation layer 600 may not include contact holes in a region that overlaps the overlapping portions 561. For example, in FIG. 17, the insulation layer 600 does not include contact holes at the intersection of metal lines 515. This is done because the second touch electrodes 502 including the overlapping portions 561 have to be insulated from the first touch electrodes 501.

Figure 19:
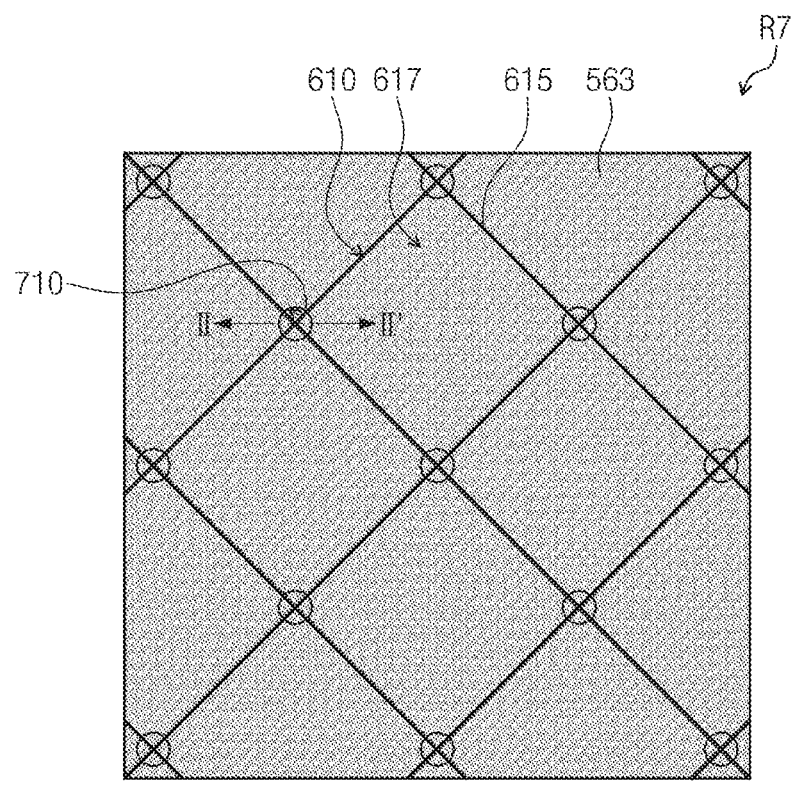
FIG. 19 is an enlarged view of a region R7 of FIG. 16.
Figure 20:
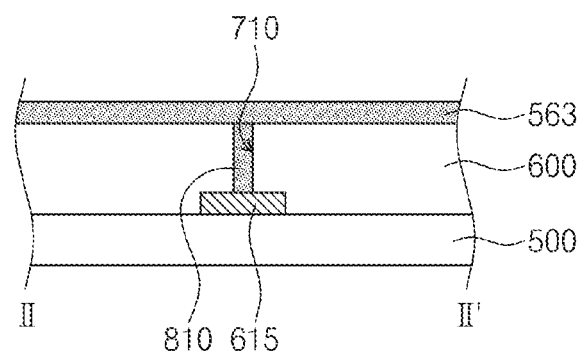
FIG. 20 is a cross-sectional view taken along sectional line II-II' of FIG. 19.

FIG. 19 is an enlarged view of a region R7 of FIG. 16 and FIG. 20 is a cross-sectional view taken along sectional line II-II' of FIG. 19.

Referring to FIGS. 15, 16, 19, and 20, the connection portions 563 covers the first auxiliary electrodes 610 disposed on the first region and the openings defined by the first auxiliary electrodes 610 disposed on the first region. The connection portions 563 may not have openings.

The connection portions 563 may not have openings to improve touch sensitivity because a distance between the connection portions 563 and the first touch electrodes 501 is longer than a distance between the connection portions 563 and the second portions 570 on the plane.

The touch panel according to an exemplary embodiment further includes first contact patterns 810.

The insulation layer 600 may include first contact holes 710. The first contact holes 710 may be defined above the first auxiliary electrode 610. For example, as illustrated in FIG. 19, the first contact holes 710 may be disposed between intersection points of the metal lines 615 of the first auxiliary electrode 610. The first contact patterns 810 may be disposed within the first contact holes 710 defined in the insulation layer 600 to electrically connect at least a portion of the first auxiliary electrodes 610 to the connection portions 563.

The first contact patterns 810 may reduce resistance of each of the connection portions 563 to improve the RC delay and touch sensitivity.

The first contact patterns 810 may be integrated with the second touch electrode 502. Also, the first contact holes 710 may variously change in position and number.

Figure 21:
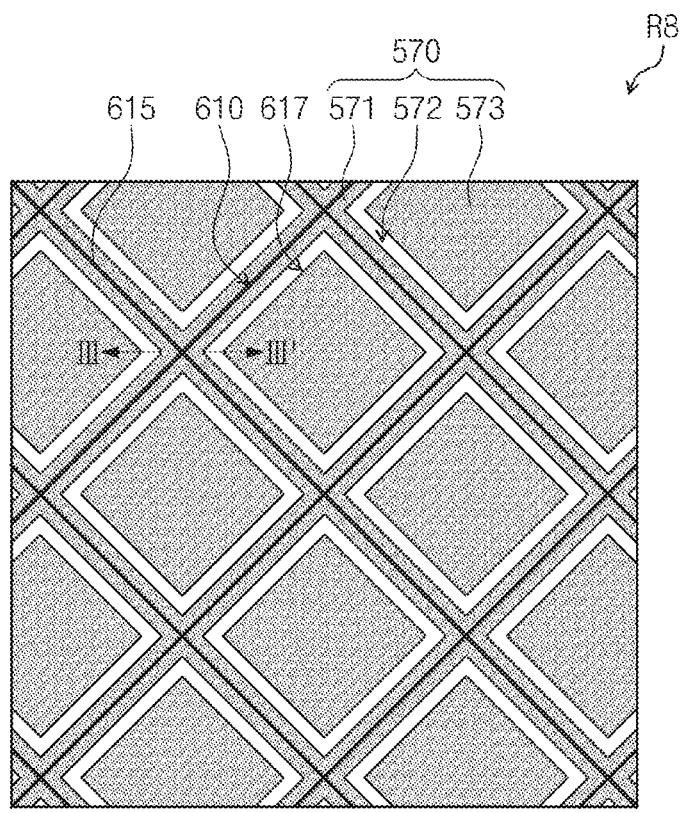
FIG. 21 is an enlarged view of a region R8 of FIG. 16.
Figure 22:
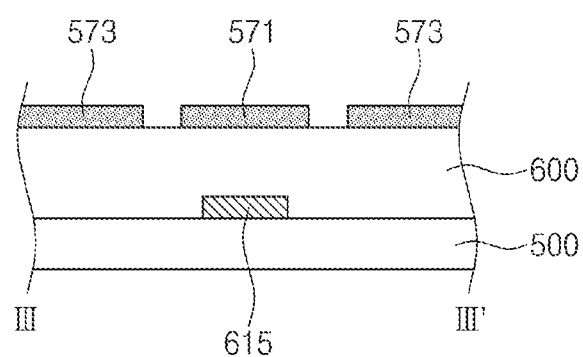
FIG. 22 is a cross-sectional view taken along sectional line III-III' of FIG. 21.

FIG. 21 is an enlarged view of a region R8 of FIG. 16, and FIG. 22 is a cross-sectional view taken along sectional line III-III' of FIG. 21.

Referring to FIGS. 15, 16, 21, and 22, the second portions 570 may include first overlapping patterns 571 and first inner patterns 573. The first overlapping patterns 571 may cover the first auxiliary electrodes 610 disposed on the second region. The first inner patterns 573 may be spaced apart from the first overlapping patterns 571 and disposed within the openings 617 defined by the corresponding first auxiliary electrodes 610. One of the first inner patterns 573 may be disposed in one opening 617 defined by the first auxiliary electrodes 610.

The second portions 570 may be closer to the first touch electrodes 501 than the connection portions 563 on the plane. To similarly adjust the touch sensitivity of the second portions 570 and the connection portions 563, openings 572 may be defined in the second portions 570. For example, the openings 572 defined in the second portions 570 may be spaced a predetermined distance from each other. Also, each of the first overlapping patterns 571 may be spaced a predetermined distance from each of the first inner patterns 573.

The first inner patterns 573 may be electrically floated.

The insulation layer 600 may not include contact holes in a region that overlaps the second portions 570. For example, in FIG. 22, the insulation layer 600 does not include contact holes at the intersection of metal lines 615. This is also done to adjust the touch sensitivity of the second portions 570 and the connection portions 563.

Hereinafter, a pattern shape of the second auxiliary electrodes 620 of FIG. 16 according to an exemplary embodiment will be described.

Figure 23:
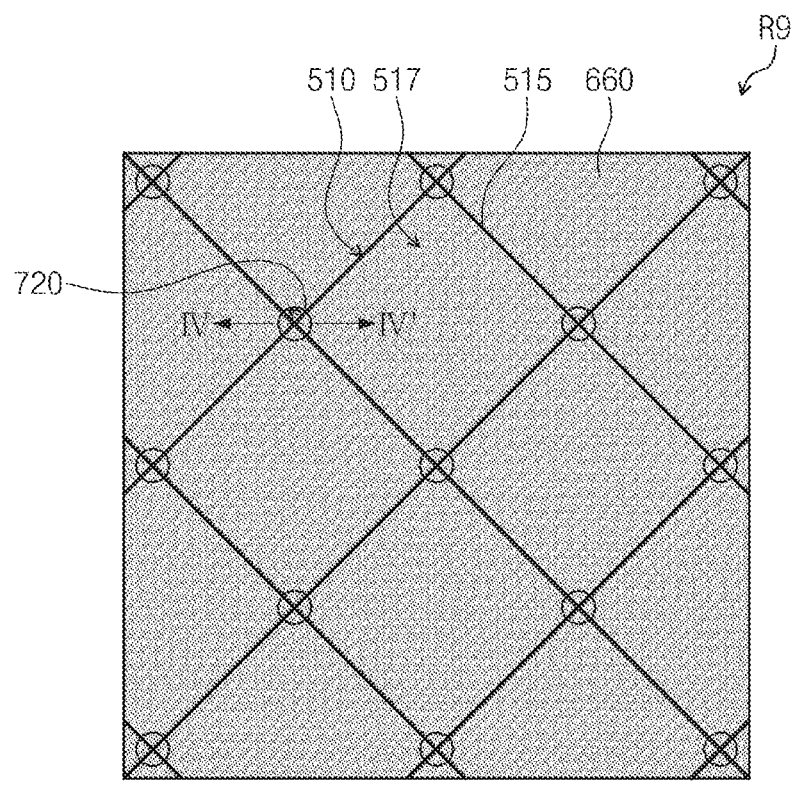
FIG. 23 is an enlarged view of a region R9 of FIG. 16.
Figure 24:
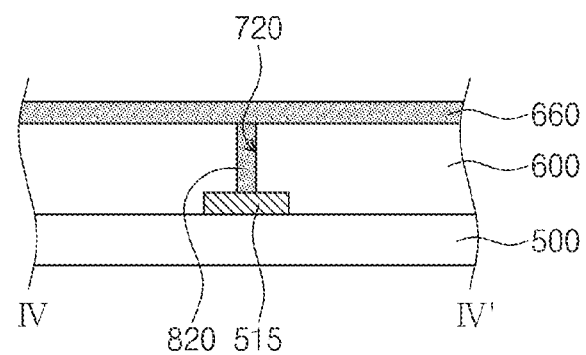
FIG. 24 is a cross-sectional view taken along sectional line IV-IV' of FIG. 23.

FIG. 23 is an enlarged view of a region R9 of FIG. 16, and FIG. 24 is a cross-sectional view taken along sectional line IV-IV' of FIG. 23.

Referring to FIGS. 15, 16, 23, and 24, the third portions 660 may have a pattern shape similar to that of the connection portions 563 that are described with reference to FIGS. 19 and 20.

The third portions 660 covers the mesh patterns 510 disposed on the third region and the openings 517 defined by the mesh patterns 510. The third portions 660 may not have openings.

The third portions 660 may not have openings to improve the touch sensitivity because a distance between the third portions 660 and the second touch electrodes 502 is longer than a distance between the fourth portions 670 and the second touch electrode 502 on the plane.

The touch panel may further include second contact patterns 820.

The insulation layer 600 may include second contact holes 720. The second contact holes 720 may be defined above the mesh patterns 510. For example, as illustrated in FIG. 23, the second contact holes 720 may be disposed between intersection points of the metal lines 515 of the mesh pattern 510. The second contact patterns 820 may be disposed within the second contact holes 720 defined in the insulation layer 600 to electrically connect at least a portion of the mesh patterns 510 to the third portions 660.

The second contact patterns 820 may reduce resistance of each of the third portions 660, thereby improving the RC delay and touch sensitivity of the touch panel.

The second contact patterns 820 may be integrated with the second auxiliary electrode 620. Also, the second contact holes 720 may variously change in position and number.

Figure 25:
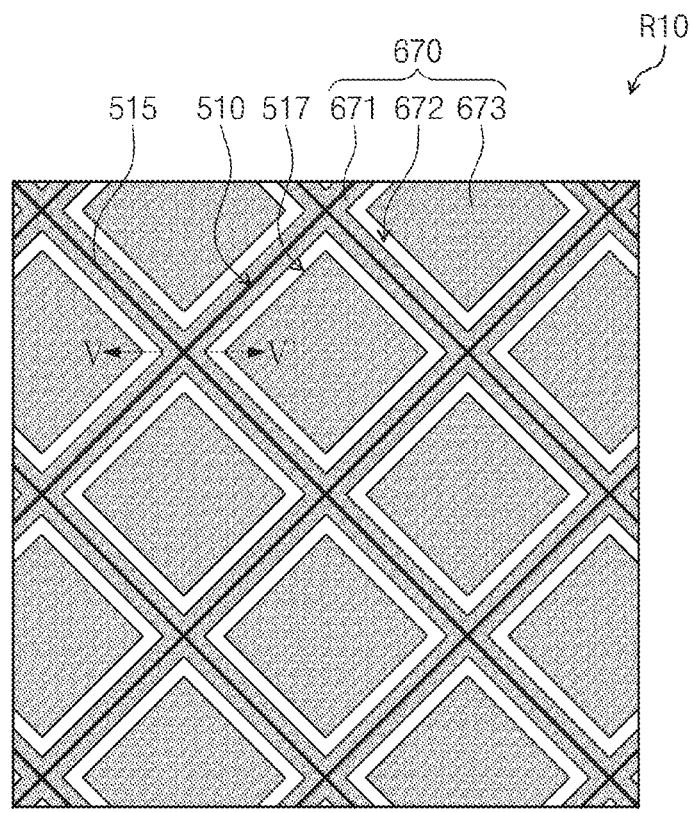
FIG. 25 is an enlarged view of a region R10 of FIG. 16.
Figure 26:
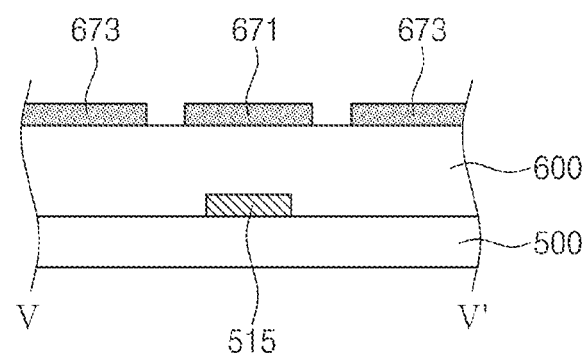
FIG. 26 is a cross-sectional view taken along sectional line V-V' of FIG. 25.

FIG. 25 is an enlarged view of a region R10 of FIG. 16, and FIG. 26 is a cross-sectional view taken along sectional line V-V' of FIG. 25.

Referring to FIGS. 15, 16, 25, and 26, the fourth portions 670 may have a pattern shape similar to that of the second portions 570 that are described with reference to FIGS. 21 and 22.

The fourth portions 670 may include second overlapping patterns 671 and second inner patterns 673. The second overlapping patterns 671 may cover the mesh patterns 510 disposed on the fourth region. The second inner patterns 673 may be spaced apart from the second overlapping patterns 671 and disposed within the openings 517 defined by the corresponding mesh patterns 510 disposed on the fourth region.

The fourth portions 670 may be closer to the second touch electrodes 502 than the third portions 660 on the plane. To similarly adjust the touch sensitivity of the fourth portions 670 and the third portions 660, openings 672 may be defined in the fourth portions 670. For example, the openings 672 defined in the fourth portions 670 may be spaced a predetermined distance from each other. Also, each of the second overlapping patterns 671 may be spaced a predetermined distance from each of the second inner patterns 673.

The second inner patterns 673 may be electrically floated.

The insulation layer 600 may not include contact holes in a region that overlaps the fourth portions 670. For example in FIG. 26, the insulation layer 600 does not include contact holes at the intersection of metal lines 515. This is done for similarly adjusting the touch sensitivity of the fourth portions 670 and the third portions 660.

Referring again to FIGS. 15 to 26, when the second touch electrodes 502 cover only a portion of the metal lines 515 and 615, a difference in visibility between the covered region and the non-covered region may occur. For example, since a material for forming the second touch electrodes 502 has a specific refractive index, light passing through the second touch electrodes 502 and then reflected by the metal lines 515 and 615 and light reflected by the metal lines 515 and 615 without passing through the second touch electrodes 502 may have a difference in optical property. Similarly, when the second auxiliary electrodes 620 cover only a portion of the metal lines 515, a difference in visibility between the covered region and the non-covered region may occur.

The second touch electrodes 502 may cover all of the metal lines 615 of the first auxiliary electrodes 610 and the metal lines 515 of at least a portion of the connection patterns 512. More specifically, all of the connection portions 563 and the second portions 570 may cover the metal lines 615 of the first auxiliary electrodes 610. The overlapping portions 561 may cover the metal lines 515 of at least a portion of the connection patterns 512.

The second auxiliary electrodes 620 may cover the metal lines 515 of at least a portion of the first touch electrodes 501. The second auxiliary electrodes 620 may cover all of the metal lines 515 of the mesh patterns 510.

In the touch panel according to an exemplary embodiment, the second touch electrodes 502 and the second auxiliary electrodes 620 may cover the metal lines 515 of the first touch electrodes 501 and the metal lines 615 of the first auxiliary electrodes 610 to secure a uniform visibility over the entire region.

Figure 27:
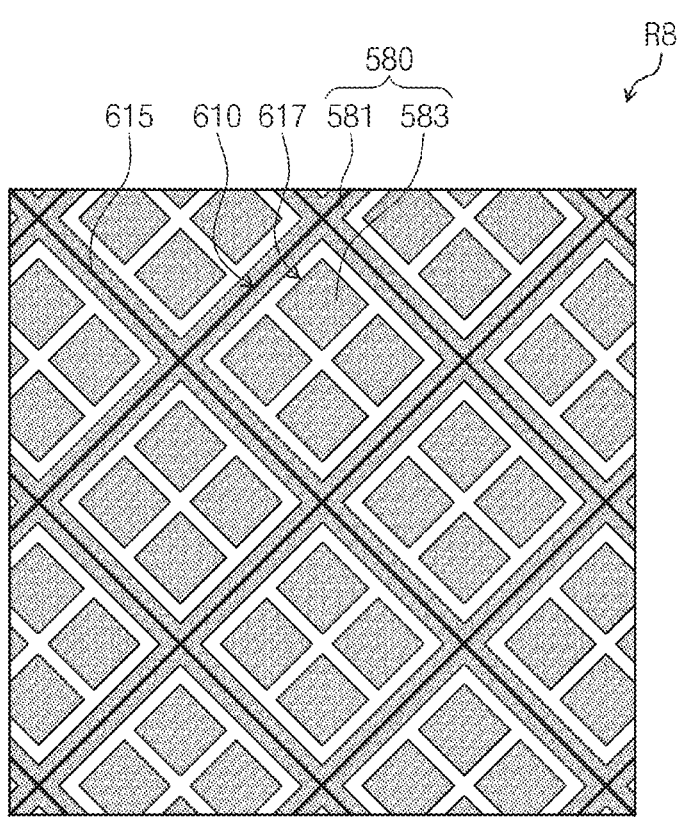
FIG. 27 is an enlarged view of the region R8 of FIG. 16 to illustrate an exemplary embodiment in which each of second portions of FIG. 21 has a shape different from that of each of second portions of FIG. 27.

FIG. 27 is an enlarged view of the region R8 of FIG. 16 to illustrate an example similar to FIG. 21 but each of the second portions 580 in FIG. 27 has a shape different from that of each of second portions 570 of FIG. 21. Differences between second portions 580 of FIG. 27 and the second portions 570 of FIG. 21 will be described with reference to FIG. 27.

The second portions 580 may include first overlapping patterns 581 and first inner patterns 583. Since the first overlapping patterns 581 are substantially the same as the first overlapping pattern 571 that are described with reference to FIG. 21, their detailed description will be omitted.

The first inner patterns 583 may be disposed in one opening 617 defined by the first auxiliary electrodes 610 on the plane. The first inner patterns 583 may be disposed in one opening 617 defined by the first auxiliary electrodes 610 on the plane. The first inner patterns 583 disposed in the one opening 617 defined by the first auxiliary electrodes 610 may be spaced apart from each other. One first inner pattern 583 of FIG. 27 may have a size less than that of one first inner pattern 573 of FIG. 21. For example, four first inner patterns 583 of FIG. 27 may be disposed in one opening 617 while one first inner pattern 573 is disposed in one opening 572 of FIG. 21.

Since the first inner patterns 583 are electrically floated, the first overlapping patterns 581 together with the conductive patterns adjacent to the first overlapping patterns 581 may form parasitic capacitors.

According to the touch panel of FIG. 27, each of the first inner patterns 583 may decrease in size to reduce capacitance of each of the parasitic capacitors and improve sensitivity of the touch panel.

Referring again to FIG. 25, each of the fourth portions 670 of the second auxiliary electrodes 620 may have a structure similar to that of each of the second portions 580 of FIG. 27. Particularly, the second inner patterns 673, which are spaced apart from each other, of the fourth portions 670 may be disposed in one opening 517 defined by the mesh patterns 510 on the plane.

Figure 28:
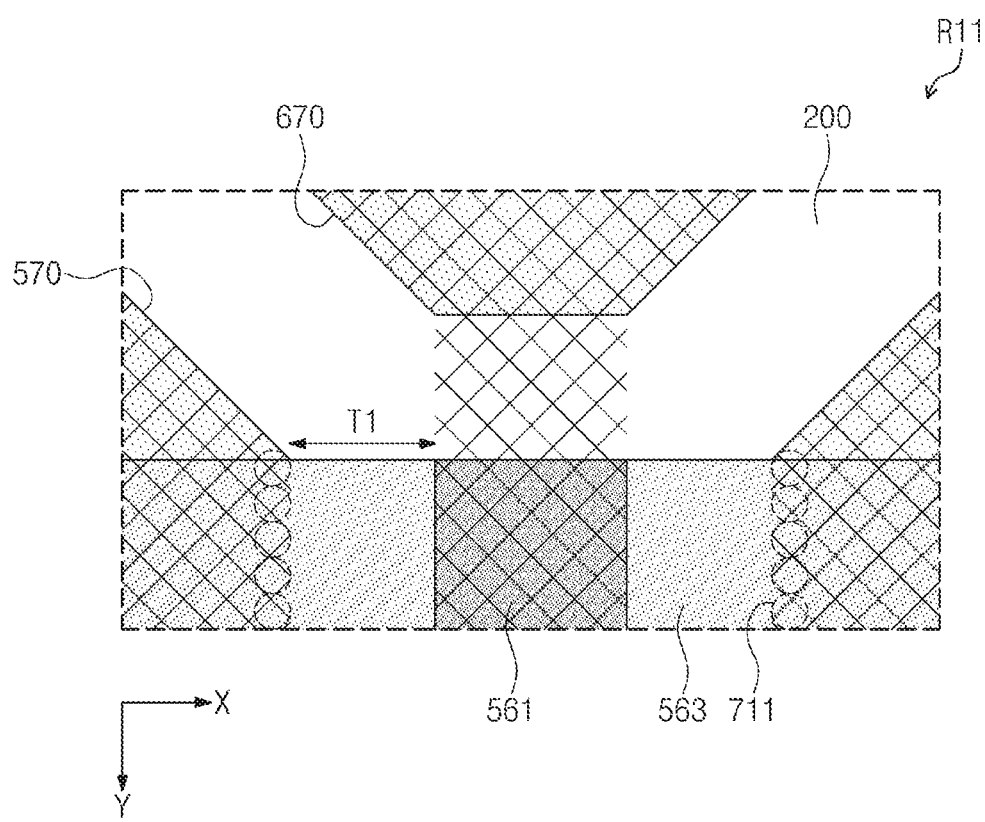
FIG. 28 is an enlarged view of a region R11 of FIG. 16.

FIG. 28 is an enlarged view of a region R11 of FIG. 16.

Referring to FIGS. 15, 16, and 28, the insulation layer 600 may further include outer contact holes 711. Each of the outer contact holes 711 may perform a function similar to that of each of the first contact holes 710. For brevity, the first contact holes 710 are omitted in FIG. 28.

The outer contact holes 711 may be defined in a region that is closest to the overlapping portions 561 in the second direction (i.e., x-axis direction) on the plane, of regions that overlap the metal lines 615 of the first auxiliary electrodes 610.

First outer contact patterns (not shown) may be disposed within the outer contact holes 711. The first outer contact patterns (not shown) may electrically connect at least a portion of the first auxiliary electrodes 610 to the connection portions 563 of the second touch electrodes 502.

Each of the outer contact holes 711 may be spaced a first distance T1 from each of the overlapping portions 561 in the second direction on the plane. For example, the first distance T1 may be within about 10 μm.

The outer contact holes 711 may be defined adjacent to each other in the first direction (i.e., the y-axis direction). If the outer contact holes 711 overlap the metal lines 615 of the first auxiliary electrodes 610, the outer contact holes 711 may be defined in position except for intersection points of the metal lines 615.

The contact holes, which are defined in positions closest to the overlapping portions 561 on the plane, of the contact holes connecting the first auxiliary electrodes 610 to the second touch electrodes 502 may be defined as the outer contact holes 711, but not be defined as the first contact holes 710, even though the contact holes are defined in the intersections of the metal lines 615 of the first auxiliary electrodes 610.

Figure 29:
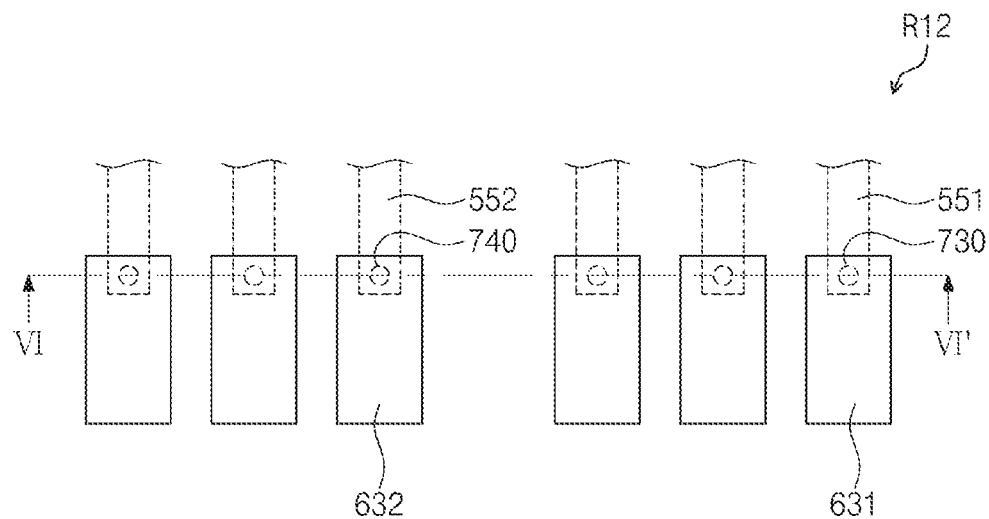
FIG. 29 is an enlarged view of a region R12 of FIG. 16.
Figure 30:
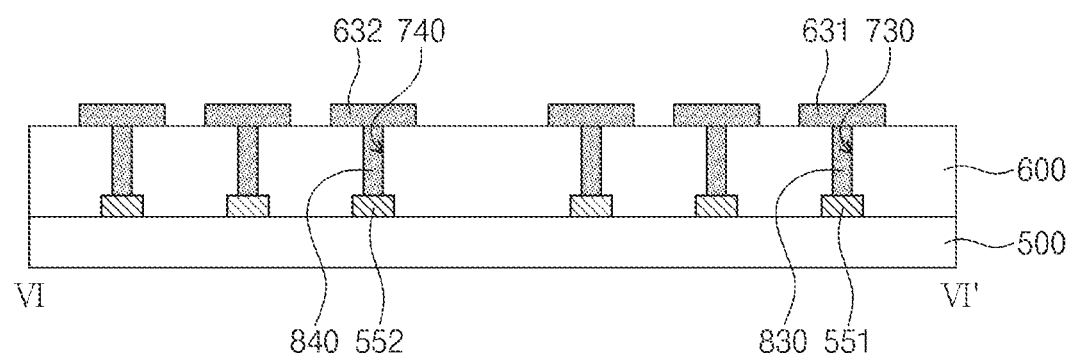
FIG. 30 is a cross-sectional view taken along sectional line VI-VI' of FIG. 29.

FIG. 29 is an enlarged view of a region R12 of FIG. 16. FIG. 30 is a cross-sectional view taken along sectional line VI-VI' of FIG. 29.

Referring to FIGS. 15, 16, 29, and 30, the touch panel may include first trace lines 551, second trace lines 552, first pads 631, second pads 632, third contact patterns 830, and fourth contact patterns 840.

Referring to FIG. 15, the first trace lines 551 may be disposed on the substrate 500. The first trace lines 151 may be electrically connected to the corresponding first touch electrodes 501. For example, the first trace lines 551 may be disposed on an outer region of the substrate 500. Also, each of the first trace lines 551 may have an end connected to outer mesh patterns 510 of each of the first touch electrodes 501 and the other end extending to the first pads 631.

Referring to FIG. 15, the second trace lines 552 may be disposed on the same layer as the first trace lines 551. The second trace lines 552 may be electrically connected to the corresponding first auxiliary electrodes 610. The second trace lines 552 may be disposed on an outer region of the substrate 500. Also, the second trace lines 552 may be electrically connected to the second touch electrodes 502 disposed on the insulation layer 600 through the first auxiliary electrodes 610 and the second contact patterns 820. More specifically, each of the second trace lines 552 may have an end connected to the outer first auxiliary electrodes 610 and the other end extending to the second pads 632.

To simplify manufacturing, the mesh patterns 510, the first auxiliary electrodes 610, the first trace lines 551, and the second trace lines 552 may be formed of the same material.

The insulation layer 600 may include third contact holes 730 and fourth contact holes 740. Each of the third contact holes 730 may be disposed on the other end of each of the first trace lines 551. For example, the third contact holes 730 may be disposed on regions where the first trace lines 551 and the first pads 631 overlap each other.

Each of the fourth contact holes 740 may be disposed on the other end of each of the second trace lines 552. For example, the fourth contact holes 740 may be disposed on regions where the second trace lines 552 and the second pads 632 overlap each other.

The first pads 631 and the second pads 632 may be disposed on the insulation layer 600. For example, the first pads 631 and the second pads 632 may be disposed on an outer region of the insulation layer 600.

The first pads 631 may be connected to the other ends of the first trace lines 551 through the corresponding third contact patterns 830. Also, the second pads 632 may be connected to the other ends of the second trace lines 552 through the corresponding fourth contact patterns 840. The third contact patterns 830 may connect the first pads 631 to the corresponding first trace lines 551 through the third contact holes 730 defined in the insulation layer 600. Also, the third contact patterns 830 may be integrated with the first pads 631. The fourth contact patterns 840 may connect the second pads 632 to the corresponding second trace lines 552 through the fourth contact holes 740 defined in the insulation layer 600. Also, the fourth contact patterns 840 may be integrated with the second pads 632.

Figure 31:
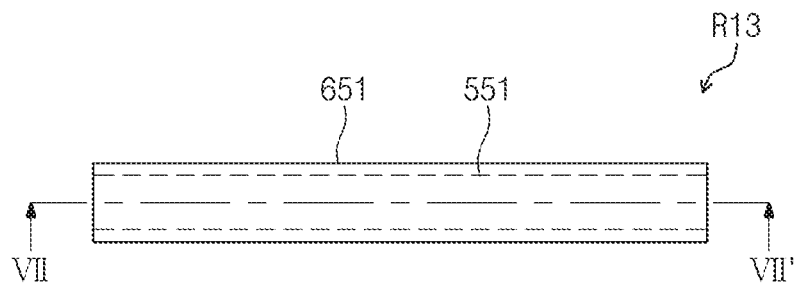
FIG. 31 is an enlarged view of a region R13 of FIG. 16.
Figure 32A:
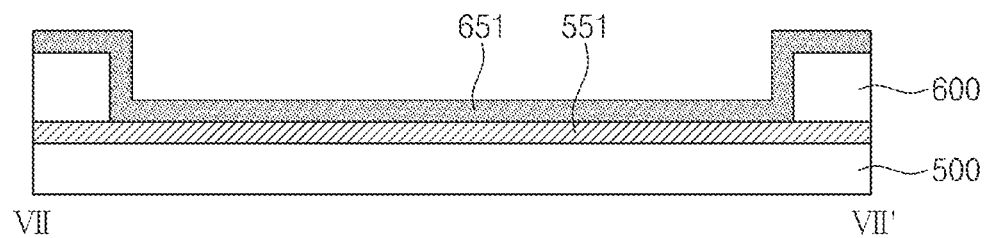
FIGS. 32A and 32B are cross-sectional views taken along sectional line VII-VII' of FIG. 31.
Figure 32B:
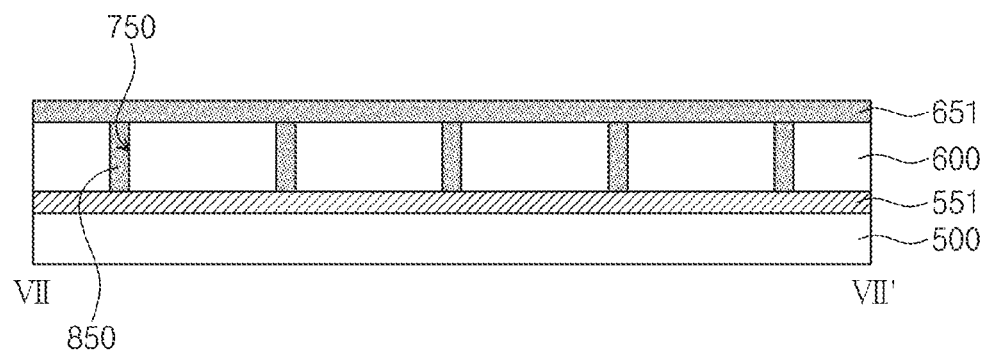

FIG. 31 is an enlarged view of a region R13 of FIG. 16. FIGS. 32A and 32B are cross-sectional views taken along sectional line VII-VII' of FIG. 31. However, FIGS. 32A and 32B illustrate different examples.

Referring to FIGS. 16, 31, 32A, and 32B, the touch panel may further include first auxiliary lines 651.

The first auxiliary lines 651 may be disposed on the insulation layer 600. For example, the first auxiliary lines 651 may be disposed on an outer region of the insulation layer 600. The first auxiliary lines 651 may be electrically connected to the corresponding first trace lines 551. Each of the first trace lines 551 may decrease in resistance, thereby improving the RC delay because the touch panel includes the first auxiliary lines 651. Here, as illustrated in FIG. 32A, the first auxiliary line 651 may be disposed above the first trace line 551 and directly connected to the first trace line 151. For example, at least a portion of the first auxiliary line 651 may directly contact a top surface of the trace line 551.

Alternately, as illustrated in FIG. 32B, the first auxiliary lines 651 may be connected to the first trace lines 551 through corresponding fifth contact holes 750 and fifth contact patterns 850. More specifically, the insulation layer 600 may include fifth contact holes 750 defined above the first trace lines 551. For example, the fifth contact holes 750 may be disposed on regions on which the first trace lines 551 and the first auxiliary lines 651 overlap each other. The fifth contact patterns 850 may connect the first trace lines 551 to the corresponding first auxiliary lines 651 through the fifth contact holes 750 defined in the insulation layer 600. Thus, even though the insulation layer 600 is disposed between the first trace lines 551 and the first auxiliary lines 651, the first trace lines 551 and the first auxiliary lines 651 may be electrically connected to each other. Here, at least portions of each of the first trace lines 551 and each of the first auxiliary lines 651 which are electrically connected to each other through the fifth contact patterns 850 may overlap each other.

Figure 33:
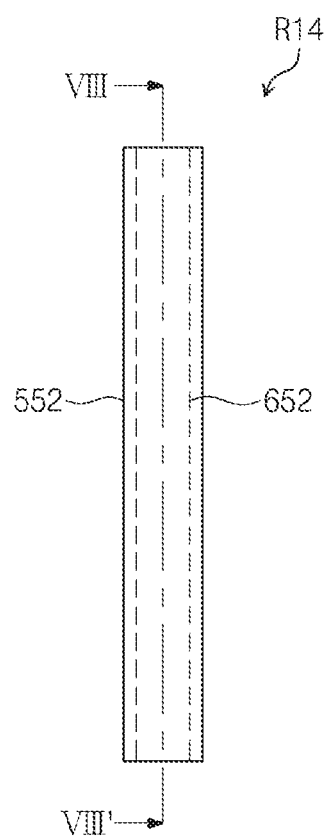
FIG. 33 is an enlarged view of a region R14 of FIG. 16.
Figure 34A:
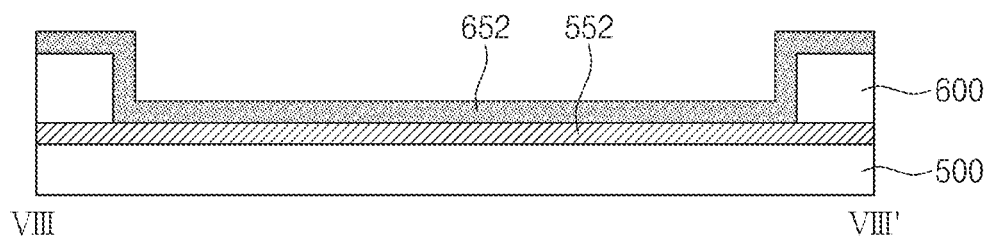
FIGS. 34A and 34B are cross-sectional views taken along sectional line VIII-VIII' of FIG. 33.
Figure 34B:
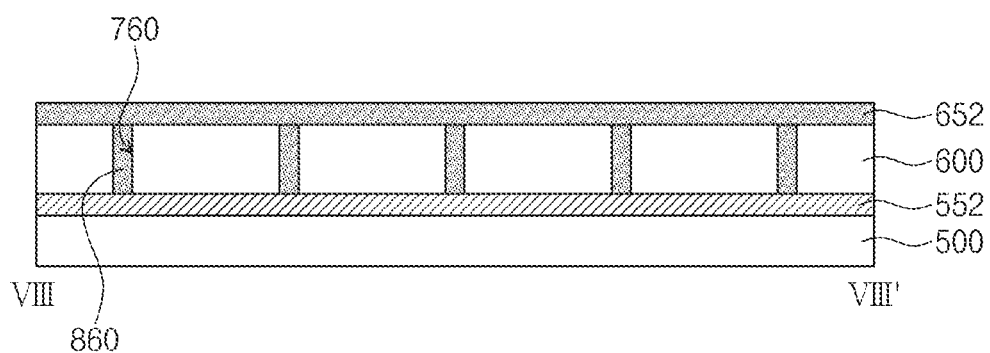

FIG. 33 is an enlarged view of a region R14 of FIG. 16. FIGS. 34A and 34B are cross-sectional views taken along sectional line VIII-VIII' of FIG. 33. However, FIGS. 34A and 34B illustrate different examples.

Referring to FIGS. 16, 33, 34A, and 34B, the touch panel may further include second auxiliary lines 652.

The second auxiliary lines 652 may be disposed on the same layer as the first auxiliary lines 651. The second auxiliary lines 652 may be disposed on the insulation layer 600. For example, the second auxiliary lines 652 may be disposed on an outer region of the insulation layer 600. The second auxiliary lines 652 may be electrically connected to the corresponding second trace lines 552. Each of the second trace lines 552 may decrease in resistance thereby improving the RC delay because the touch panel includes the second auxiliary lines 652. Here, as illustrated in FIG. 34A, the second auxiliary lines 652 may be disposed above the second trace lines 552 and directly connected to the corresponding second trace lines 552. For example, at least a portion of the second auxiliary lines 652 may directly contact top surfaces of the second trace lines 552.

Alternately, as illustrated in FIG. 34B, the second auxiliary lines 652 may be connected to the corresponding second trace lines 552 through sixth contact holes 760 and sixth contact patterns 860. More specifically, the insulation layer 600 may include sixth contact holes 760 defined above the second trace lines 552. For example, the sixth contact holes 760 may be disposed on regions where the second trace lines 552 and the second auxiliary lines 652 overlap each other. The sixth contact patterns 860 may connect the second trace lines 552 to the corresponding second auxiliary lines 652 through the sixth contact holes 760 defined in the insulation layer 600. Thus, even though the insulation layer 600 is disposed between the second trace lines 552 and the second auxiliary lines 652, the second trace lines 552 and the second auxiliary lines 652 may be electrically connected to each other. Here, at least portions of each of the second trace lines 552 and each of the second auxiliary lines 652, which are electrically connected to each other through the sixth contact patterns 860, may overlap each other.

To simplify manufacturing, the second touch electrodes 502, the second auxiliary electrodes 620, the first auxiliary lines 651, and the second auxiliary lines 652 may be formed of the same material.

Hereinafter, a pattern shape of the second touch electrodes 502 of FIG. 16 according to another embodiment will be described.

Figure 35:
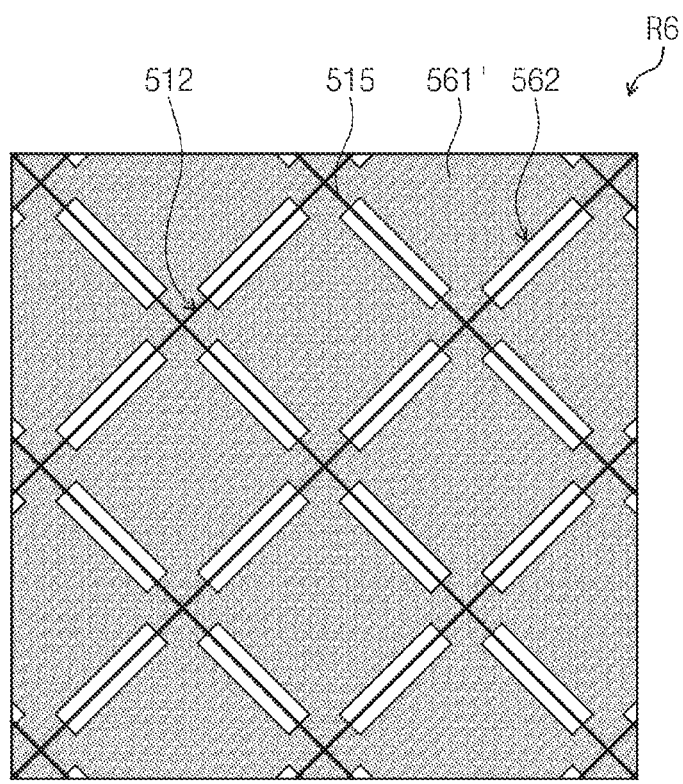
FIG. 35 is an enlarged view of a region R6 of FIG. 16.

FIG. 35 is an enlarged view of a region R6 of FIG. 16. Differences between overlapping portions 561' of FIG. 35 and the overlapping portions 561 of FIG. 17 will be described with reference to FIGS. 15, 16, and 35.

Overlapping portions 561' may cover a portion of the connection patterns 512 disposed on the first region. More specifically, the overlapping portions 561' may expose a portion of the connection patterns 512 disposed on the first region. The overlapping portions 561' may include openings 562 through which the connection patterns 512 are exposed. The overlapping portions 561' may cover the intersections of the metal lines 515 of the connection patterns 512. The overlapping portions 561' may expose portions except for the intersection points of the metal lines 515 of the connection pattern 512 through the openings 562.

In FIG. 35, each of the openings 562 has a rectangular shape. However, the present disclosure is not limited to such an embodiment. For example, the opening 562 may have various shapes (i.e., an oval shape, a polygonal shape, and so on).

Figure 36:
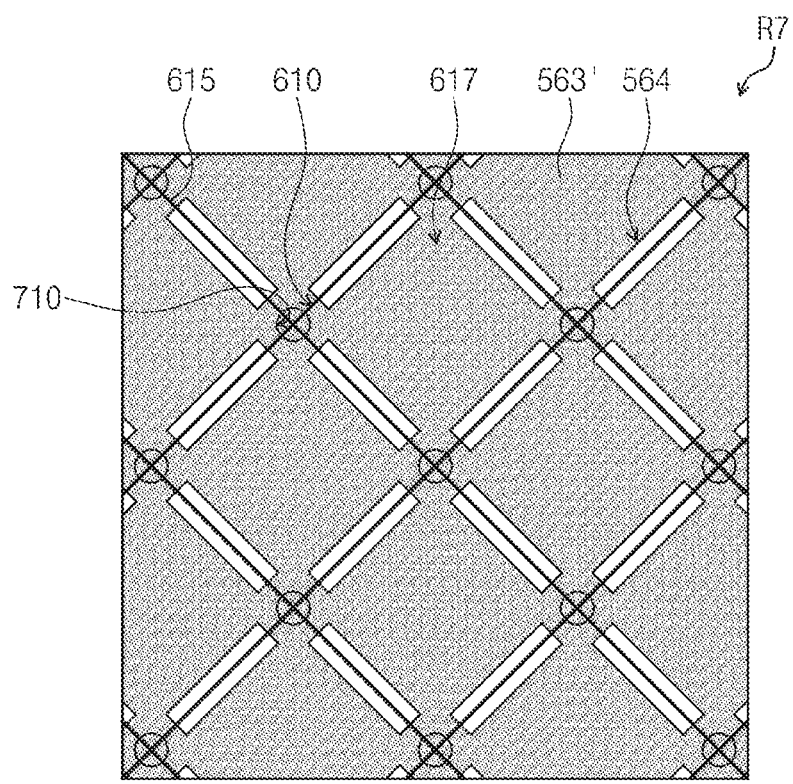
FIG. 36 is an enlarged view of a region R7 of FIG. 16.

FIG. 36 is an enlarged view of a region R7 of FIG. 16. Differences between connection portions 563' of FIG. 36 and the connection portion 563 of FIG. 19 will be described with reference to FIGS. 15, 16, and 36.

Referring to FIG. 36, the connection portions 563' may cover a portion of the first auxiliary electrodes 610 disposed on the first region. More specifically, the connection portions 563' may expose a portion of the first auxiliary electrodes 610 disposed on the first region. The connection portions 563' may include openings 564 through which the first auxiliary electrodes 610 are exposed. The opening 564 may have various shapes (i.e., an oval shape, a polygonal shape, and so on). The connection portions 563' may cover the intersections of the metal lines 615 of the first auxiliary electrodes 610. The connection portions 563' may expose portions except for the intersection points of the metal lines 615 of the first auxiliary electrodes 610 through the openings 564.

Since the first contact holes 710 and the first contact patterns 810 are substantially the same as those of FIGS. 19 and 20, their detailed descriptions will be omitted.

Figure 37:
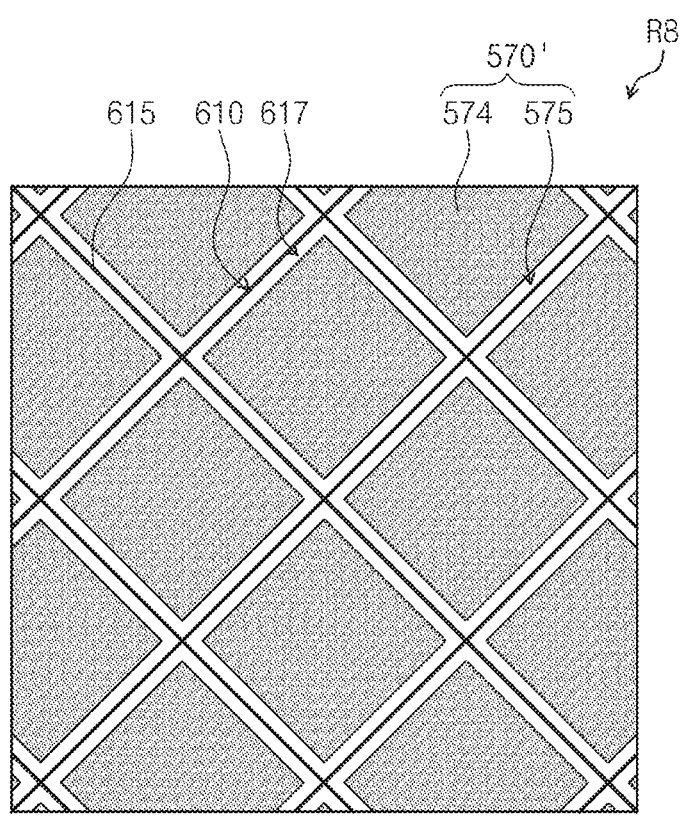
FIG. 37 is an enlarged view of a region R8 of FIG. 16.

FIG. 37 is an enlarged view of a region R8 of FIG. 16. Differences between second portions 570' and the second portion 570 of FIG. 21 will be described with reference to FIGS. 15, 16, and 37.

Referring to FIG. 37, the second portions 570' may be disposed outside the connection portions 563'. The second portions 570' may include first inner patterns 574. The first inner patterns 574 may be disposed in the openings 617 defined by the first auxiliary electrodes 610 on the plane. In FIG. 37, one of the first inner patterns 574 may be disposed in one opening 617 defined by the first auxiliary electrodes 610.

The second portions 570' may include openings 575 defined between the first auxiliary electrodes 610 adjacent to each other. The second portions 570' may expose portions except for the intersection points of the metal lines 615 of the first auxiliary electrodes 610 through the openings 575. For example, the openings 575 defined in the second portions 570' may be spaced a predetermined distance from each other.

The first inner patterns 574 may be electrically floated.

Figure 38:
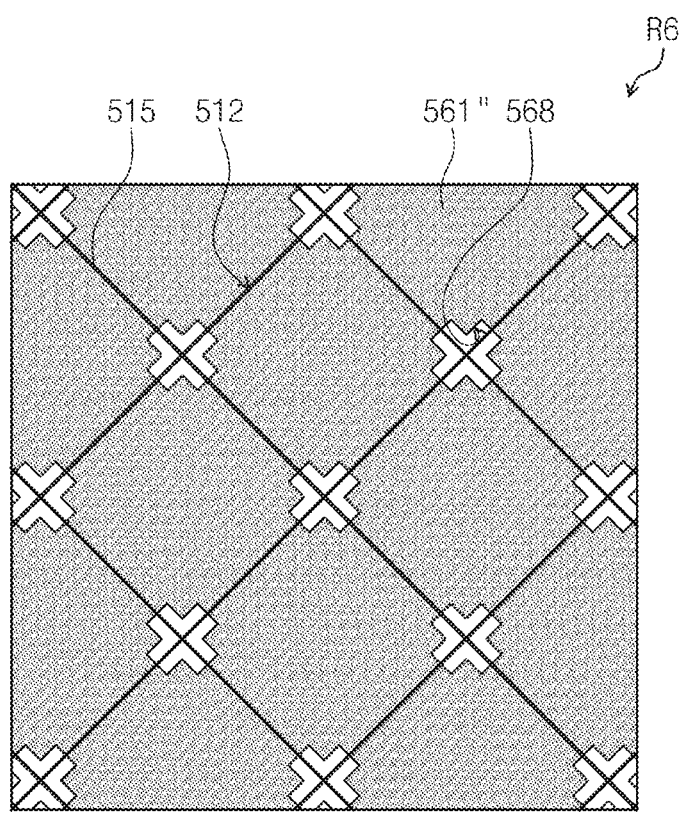
FIG. 38 is an enlarged view of the region R6 of FIG. 16 to illustrate an exemplary embodiment in which each of overlapping portions of FIG. 35 has a shape different from that of each of overlapping portions of FIG. 38.

FIG. 38 is an enlarged view of the region R6 of FIG. 16, wherein each of overlapping portions 561' of FIG. 35 has a shape different from that of each of overlapping portions 561" of FIG. 38.

Overlapping portions 561" may cover a portion of the connection patterns 512 disposed on the first region. More specifically, the overlapping portions 561" may expose a portion of the connection patterns 512 disposed on the first region. The overlapping portions 561" may include openings 568 through which the connection patterns 512 are exposed. The overlapping portions 561" may cover portions except for the intersections of the metal lines 515 of the connection patterns 512. The overlapping portions 561" may expose the intersection points of the metal lines 515 of the connection pattern 512 through the openings 562.

In FIG. 38, each of the openings 568 may have a cross shape in which each of the intersection points of the metal lines 515 of the connection patterns 512 and a portion of surrounding of the intersection point are exposed. However, the present disclosure is not limited to such an embodiment. For example, the opening 568 may have various shapes (i.e., an oval shape, a polygonal shape, and so on).

Hereinafter, a pattern shape of the second auxiliary electrodes 620 of FIG. 16 according to another embodiment will be described.

Figure 39:
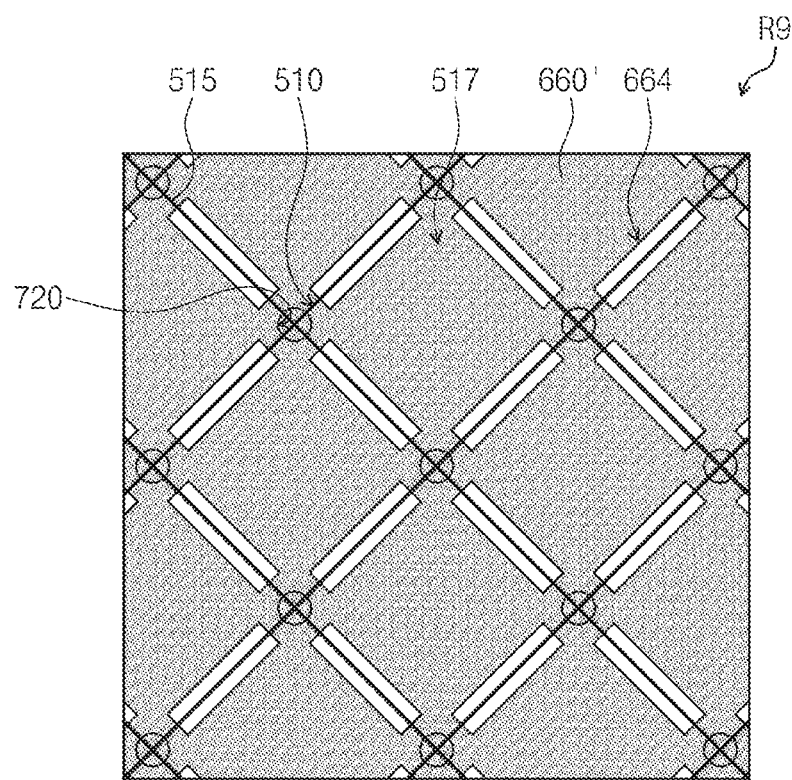
FIG. 39 is an enlarged view of a region R9 of FIG. 16.

FIG. 39 is an enlarged view of a region R9 of FIG. 16. Differences between third portions 660' and the third portion 660 of FIG. 23 will be described with reference to FIGS. 15, 16, and 39.

The third portions 660' may cover a portion of the mesh patterns 510 disposed on the third region. More specifically, the third portions 660' may cover a portion of the mesh patterns 510 disposed on the third region. The third portions 660' may include openings 664 through which the mesh patterns 510 are exposed. The opening 664 may have various shapes (i.e., an oval shape, a polygonal shape, and so on). The third portions 660' may cover the intersections of the metal lines 515 of the mesh patterns 510. The third portions 660' may expose portions except for the intersection points of the metal lines 515 of the mesh pattern 510 through the openings 664.

Since the second contact holes 720 and the second contact patterns 820 are substantially the same as those of FIGS. 23 and 24, their detailed descriptions will be omitted.

Figure 40:
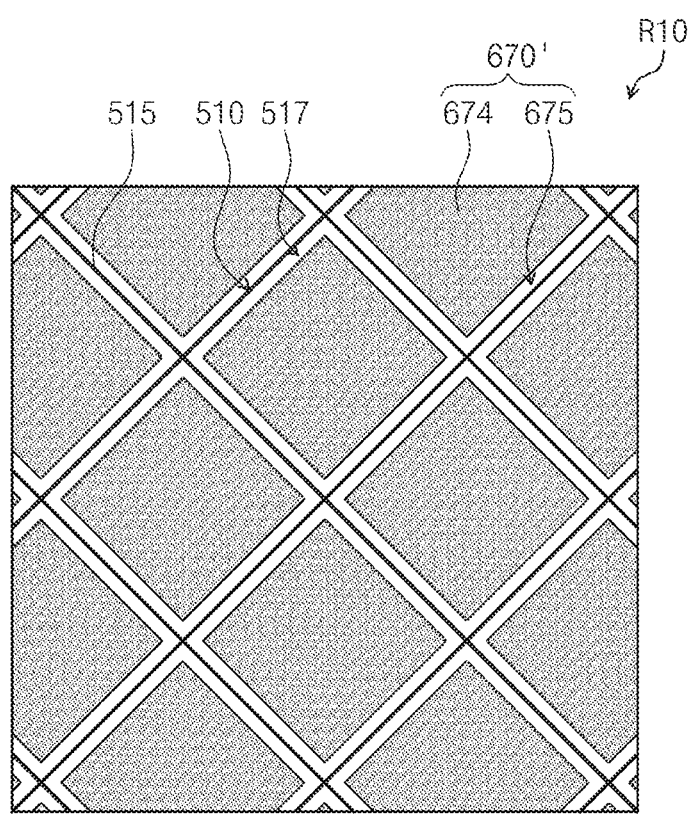
FIG. 40 is an enlarged view of a region R10 of FIG. 16.

FIG. 40 is an enlarged view of a region R10 of FIG. 16. Differences between fourth portions 670' and the fourth portion 670 of FIG. 25 will be described with reference to FIGS. 15, 16, and 40.

The fourth portions 670' may include second inner patterns 674. The second inner patterns 674 may be disposed in the openings 517 defined by the mesh pattern 510 on the plane. In FIG. 39, one of the second inner patterns 674 may be disposed in one opening 517 defined by the mesh patterns 510. The fourth portions 670' may include openings 675 defined between the second inner patterns 674 adjacent to each other. The fourth portions 670' may expose the metal lines 515 of the mesh patterns 510 disposed on the fourth region through the openings 675. For example, the openings 675 defined in the fourth portions 670' may be spaced a predetermined distance from each other.

The second inner patterns 674 may be electrically floated.

Referring to FIGS. 35 to 40, the second touch electrodes 502 may expose the metal lines 615 of the first auxiliary electrodes 610 and the metal lines 515 of at least a portion of the connection patterns 512. Particularly, the connection portions 563' may expose a portion of the metal lines 615 of the first auxiliary electrodes 610. The second portions 570' may expose the metal lines 615 of the first auxiliary electrodes 610. The overlapping portions 561' may expose a portion of the connection patterns 512.

The second auxiliary electrodes 620 may expose a portion of the metal lines 515 of the first touch electrodes 501. Particularly, the third portions 660' may expose the metal lines 515 of the first touch electrodes 501. The fourth portions 670' may expose the metal lines 515 of the first touch electrodes 501.

In the touch panel according to an exemplary embodiment, the second touch electrodes 502 and the second auxiliary electrodes 620 expose the metal lines 515 of the first touch electrodes 501 and the metal lines 615 of the first auxiliary electrodes 610 to secure the uniform visibility over the entire region.

Figure 41:
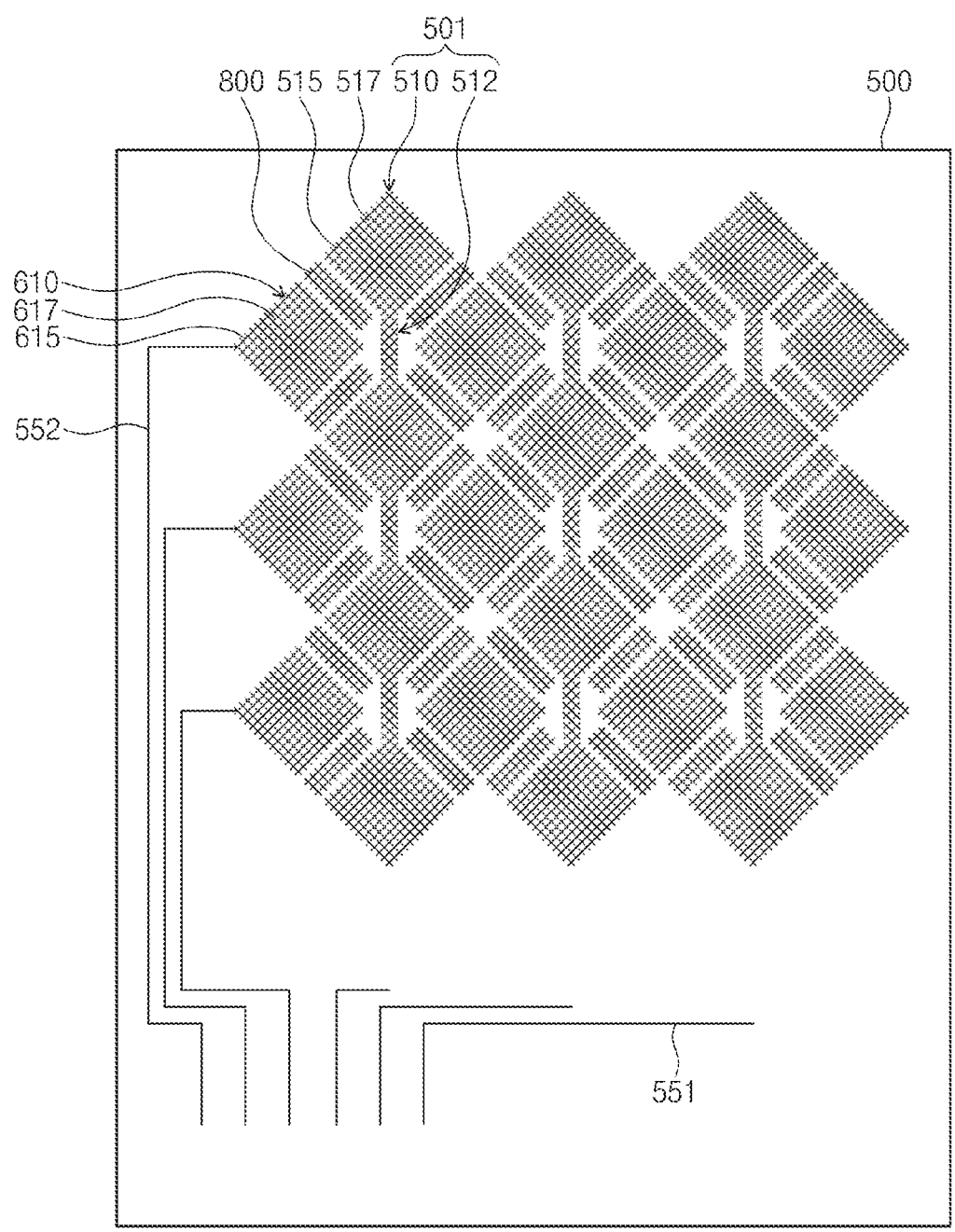
FIG. 41 is a view of dummy patterns according to an exemplary embodiment.

FIG. 41 is a view of dummy patterns according to an exemplary embodiment.

Referring to FIG. 41, the touch panel may include dummy patterns 800.

There are differences in features such as reflectivity, transmittance, and the like between a region on which the mesh patterns 510 and the first auxiliary electrodes 610 exist and a region on which the mesh patterns 510 and the first auxiliary electrodes 610 do not exist. Thus, to realize uniformity in these features, the dummy patterns 800 may be disposed between the mesh patterns 510 and the first auxiliary electrodes 610.

The dummy patterns 800 may be disposed on the substrate 500 and be in an electrically floated state. More specifically, each of the dummy patterns 800 may be spaced a predetermined distance from each of the mesh patterns 510 and the first auxiliary electrodes 610. Also, each of the dummy patterns 800 may have a mesh shape, like the mesh patterns 510.

As described above, according to the embodiments, the auxiliary mesh electrode is provided in a touch panel to reduce resistance of the touch electrode and thus improve the RC delay of the touch panel. Also, according to the embodiments, the touch panel is capable of securing uniform visibility over the entire region of the touch panel.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch panel, comprising:
a film;
first touch electrodes, each of the first touch electrodes comprising first mesh patterns disposed on the film;
an insulation layer disposed on the first touch electrodes and comprising a plurality of first contact holes and a plurality of second contact holes;
second touch electrodes, each of the second touch electrodes comprising second mesh patterns disposed on the insulation layer;
first auxiliary mesh electrodes disposed on the film, each of the first auxiliary mesh electrodes being electrically connected to each of the second mesh patterns through the plurality of first contact holes; and
second auxiliary mesh electrodes disposed on the insulation layer, each of the second auxiliary mesh electrodes being electrically connected to each of the first mesh patterns through the plurality of second contact holes, wherein:
each of the first mesh patterns and the second mesh patterns comprises metal lines defining openings;
each of the first auxiliary mesh electrodes and the second auxiliary mesh electrodes comprises metal lines defining openings;
each of the metal lines of the first auxiliary mesh electrodes has a width different from a width of each of the metal lines of the second mesh patterns; and
each of the metal lines of the second auxiliary mesh electrodes has a width different from a width of the metal lines of the first mesh patterns.

2. The touch panel of claim 1, wherein:
at least a portion of each of the second mesh patterns and at least a portion of each of the first auxiliary mesh electrodes, which are electrically connected to each other, overlap each other; and
at least a portion of each of the first mesh patterns and at least a portion of each of the second auxiliary mesh electrodes, which are electrically connected to each other, overlap each other.

3. The touch panel of claim 1, wherein:
the first mesh patterns and the first auxiliary mesh electrodes are formed of the same material; and
the second mesh patterns and the second auxiliary mesh electrodes are formed of the same material.

4. The touch panel of claim 1, wherein:
each of the metal lines of the first auxiliary mesh electrodes has the width less than the width of each of the metal lines of the second mesh patterns; and
each of the metal lines of the second auxiliary mesh electrodes has the width greater than that the width of the metal lines of the first mesh patterns.

5. The touch panel of claim 1, further comprising:
first trace lines disposed on the same layer as the first touch electrodes, the first trace lines being directly connected to the first touch electrodes; and
second trace lines disposed on the same layer as the first auxiliary mesh electrodes, the second trace lines being directly connected to the first auxiliary mesh electrodes and being electrically connected to the second touch electrodes through the first auxiliary mesh electrodes and the first contact hole.

6. The touch panel of claim 5, further comprising:
first and second pads disposed on the insulation layer;
third contact patterns connecting the first pads to the first trace lines through third contact holes defined in the insulation layer;
fourth contact patterns connecting the second pads to the second trace lines through fourth contact holes defined in the insulation layer;
first auxiliary lines disposed on the insulation layer, the first auxiliary lines being electrically connected to the first trace lines; and
second auxiliary lines disposed on the insulation layer, the second auxiliary lines being electrically connected to the second trace lines.

7. The touch panel of claim 6, wherein:
each of the first auxiliary lines has a width different from a width of each of the first trace lines; and
each of the second auxiliary lines has a width different from a width of each of the second trace lines.

8. The touch panel of claim 1, further comprising dummy mesh patterns disposed on a same level as the first mesh patterns and the first auxiliary mesh electrodes and arranged between the first mesh patterns and the first auxiliary mesh electrodes.

9. A touch panel, comprising:
a film;
first touch electrodes, each of the first touch electrodes comprising first mesh patterns disposed on the film;
an insulation layer disposed on the first touch electrodes and comprising a plurality of first contact holes and a plurality of second contact holes;
second touch electrodes, each of the second touch electrodes comprising second mesh patterns disposed on the insulation layer;
first auxiliary mesh electrodes disposed on the film, each of the first auxiliary mesh electrodes being electrically connected to each of the second mesh patterns through the plurality of first contact holes;
second auxiliary mesh electrodes disposed on the insulation layer, each of the second auxiliary mesh electrodes being electrically connected to each of the first mesh patterns through the plurality of second contact holes;
first trace lines disposed on the same layer as the first touch electrodes, the first trace lines being directly connected to the first touch electrodes; and
second trace lines disposed on the same layer as the first auxiliary mesh electrodes, the second trace lines being directly connected to the first auxiliary mesh electrodes and being electrically connected to the second touch electrodes through the first auxiliary mesh electrodes and the first contact hole.

10. A touch panel, comprising:
a film;
first touch electrodes, each of the first touch electrodes comprising first mesh patterns disposed on the film;
second touch electrodes, each of the second touch electrodes comprising second mesh patterns disposed on the film;
first auxiliary mesh electrodes disposed on the film;
second auxiliary mesh electrodes disposed on the film;
first trace lines disposed on the same layer as the first touch electrodes, the first trace lines being directly connected to the first touch electrodes;
second trace lines disposed on the same layer as the first auxiliary mesh electrodes;
an insulation layer disposed on the second trace lines and comprising a plurality of contact holes; and
auxiliary lines disposed on the insulation layer, the auxiliary lines being electrically connected to the first trace lines through the plurality of contact holes,
wherein:
the first touch electrodes are overlapped with the first auxiliary mesh electrodes in a plan view; and
the first trace lines are overlapped with the auxiliary lines in a plan view.

11. The touch panel of claim 10, wherein:
the first mesh patterns and the first auxiliary mesh electrodes are formed of the same material; and
the second mesh patterns and the second auxiliary mesh electrodes are formed of the same material.

12. The touch panel of claim 10, wherein each of the first mesh patterns and the second mesh patterns comprises metal lines defining openings,
each of the first auxiliary mesh electrodes and the second auxiliary mesh electrodes comprises metal lines defining openings,
each of the metal lines of the first auxiliary mesh electrodes has a width less than a width of each of the metal lines of the first mesh patterns.

13. The touch panel of claim 1, further comprising:
a plurality of first contact patterns connecting one of the second mesh patterns to the corresponding one of the first auxiliary mesh electrodes through the first contact holes defined in the insulation layer; and
a plurality of second contact patterns connecting one of the first mesh patterns to the corresponding one of the second auxiliary mesh electrodes through the second contact holes defined in the insulation layer.

* * * * *